US010994473B2

(12) United States Patent
Renn

(10) Patent No.: US 10,994,473 B2
(45) Date of Patent: May 4, 2021

(54) FABRICATION OF THREE DIMENSIONAL STRUCTURES BY IN-FLIGHT CURING OF AEROSOLS

(71) Applicant: Optomec, Inc., Albuquerque, NM (US)

(72) Inventor: Michael J. Renn, Hudson, WI (US)

(73) Assignee: Optomec, Inc., Albuquerque, NM (US)

( * ) Notice: Subject to any disclaimer, the term of this patent is extended or adjusted under 35 U.S.C. 154(b) by 953 days.

(21) Appl. No.: 15/040,878

(22) Filed: Feb. 10, 2016

(65) Prior Publication Data

US 2016/0229119 A1 Aug. 11, 2016

Related U.S. Application Data

(60) Provisional application No. 62/114,354, filed on Feb. 10, 2015.

(51) Int. Cl.
*B29C 64/112* (2017.01)
*B29C 64/159* (2017.01)
(Continued)

(52) U.S. Cl.
CPC .......... *B29C 64/112* (2017.08); *B29C 64/159* (2017.08); *B29C 64/245* (2017.08); (Continued)

(58) Field of Classification Search
None
See application file for complete search history.

(56) References Cited

U.S. PATENT DOCUMENTS 3,474,971 A 10/1969 Goodrich
3,590,477 A 7/1971 Cheroff et al.
(Continued)

FOREIGN PATENT DOCUMENTS

CN 2078199 6/1991
CN 1452554 10/2003
(Continued)

OTHER PUBLICATIONS

O'Reilly, Mike and Jeff Leal (2010) "Jetting Your Way to Fine-pitch 3D Interconnects", Chip Scale Review, Oct. 2010. (Year: 2010).*
(Continued)

*Primary Examiner* — Joseph S Del Sole
*Assistant Examiner* — Manley L Cummins, IV
(74) *Attorney, Agent, or Firm* — Peacock Law P.C.; Philip D. Askenazy

(57) ABSTRACT

A method for fabricating three-dimensional structures. In-flight heating or UV illumination modifies the properties of aerosol droplets as they are jetted onto a target surface. The UV light at least partially cures photopolymer droplets, or alternatively causes droplets of solvent-based nanoparticle dispersions to rapidly dry in-flight, and the resulting increased viscosity of the aerosol droplets facilitates the formation of free standing three-dimensional structures. This 3D fabrication can be performed using a wide variety of photopolymer, nanoparticle dispersion, and composite materials. The resulting 3D shapes can be free standing, fabricated without supports, and can attain arbitrary shapes by manipulating the print nozzle relative to the target substrate.

14 Claims, 16 Drawing Sheets

(51) Int. Cl.

| | |
|---|---|
| ***B29C 64/30*** | (2017.01) |
| ***B29C 64/245*** | (2017.01) |
| *B29C 35/08* | (2006.01) |
| *B33Y 10/00* | (2015.01) |
| *B29K 105/00* | (2006.01) |
| *B29K 105/16* | (2006.01) |
| *B29C 64/209* | (2017.01) |
| *B29C 64/264* | (2017.01) |
| *B33Y 40/00* | (2020.01) |

(52) U.S. Cl.

CPC ............ *B29C 64/30* (2017.08); *B29C 64/209* (2017.08); *B29C 64/264* (2017.08); *B29C 2035/0827* (2013.01); *B29K 2105/0061* (2013.01); *B29K 2105/16* (2013.01); *B33Y 10/00* (2014.12); *B33Y 40/00* (2014.12)

(56) References Cited

U.S. PATENT DOCUMENTS 3,642,202 A 2/1972 Angelo
3,715,785 A 2/1973 Brown et al.
3,777,983 A 12/1973 Hibbins
3,808,550 A 3/1974 Ashkin
3,808,432 A 4/1974 Ashkin
3,816,025 A 6/1974 O'Neill
3,846,661 A 11/1974 Brown et al.
3,854,321 A 12/1974 Dahneke
3,901,798 A 8/1975 Peterson
3,959,798 A 5/1976 Hochberg et al.
3,974,769 A 8/1976 Hochberg et al.
3,982,251 A 9/1976 Hochberg
4,004,733 A 1/1977 Law
4,016,417 A 4/1977 Benton
4,019,188 A 4/1977 Hochberg et al.
4,034,025 A 7/1977 Martner
4,036,434 A 7/1977 Anderson et al.
4,046,073 A 9/1977 Mitchell et al.
4,046,074 A 9/1977 Hochberg et al.
4,073,436 A 2/1978 Behr
4,092,535 A 5/1978 Ashkin et al.
4,112,437 A 9/1978 Mir et al.
4,132,894 A 1/1979 Yule
4,171,096 A 10/1979 Welsh et al.
4,200,669 A 4/1980 Schaefer et al.
4,228,440 A 10/1980 Horike et al.
4,235,563 A 11/1980 Hine et al.
4,269,868 A 5/1981 Livsey
4,323,756 A 4/1982 Brown et al.
4,400,408 A 8/1983 Asano et al.
4,453,803 A 6/1984 Hidaka et al.
4,485,387 A 11/1984 Drumheller
4,497,692 A 2/1985 Gelchinski et al.
4,601,921 A 7/1986 Lee
4,605,574 A 8/1986 Yonehara et al.
4,670,135 A 6/1987 Marple et al.
4,685,563 A 8/1987 Cohen et al.
4,689,052 A 8/1987 Ogren et al.
4,694,136 A 9/1987 Kasner et al.
4,724,299 A 2/1988 Hammeke
4,733,018 A 3/1988 Prabhu et al.
4,823,009 A 4/1989 Biemann et al.
4,825,299 A 4/1989 Okada et al.
4,826,583 A 5/1989 Biernaux et al.
4,893,886 A 1/1990 Ashkin et al.
4,895,735 A * 1/1990 Cook .................... C23C 14/048 156/234
4,904,621 A 2/1990 Loewenstein et al.
4,911,365 A 3/1990 Thiel et al.
4,917,830 A 4/1990 Ortiz et al.
4,920,254 A 4/1990 Decamp et al.
4,927,992 A 5/1990 Whitlow et al.
4,947,463 A 8/1990 Matsuda et al.
4,971,251 A 11/1990 Dobrick et al.
4,978,067 A 12/1990 Berger et al.
4,997,809 A 3/1991 Gupta
5,032,850 A 7/1991 Andeen et al.
5,038,014 A 8/1991 Pratt et al.
5,043,548 A 8/1991 Whitney et al.
5,064,685 A 11/1991 Kestenbaum et al.
5,126,102 A 6/1992 Takahashi et al.
5,152,462 A * 10/1992 Evans ....................... B05B 7/02 239/304
5,164,535 A 11/1992 Leasure
5,170,890 A 12/1992 Wilson et al.
5,173,220 A 12/1992 Reiff et al.
5,176,328 A 1/1993 Alexander
5,176,744 A 1/1993 Muller
5,182,430 A 1/1993 Lagain
5,194,297 A 3/1993 Scheer et al.
5,208,431 A 5/1993 Uchiyama et al.
5,245,404 A 9/1993 Jannson et al.
5,250,383 A 10/1993 Naruse
5,254,832 A 10/1993 Gartner et al.
5,270,542 A 12/1993 McMurry et al.
5,292,418 A 3/1994 Morita et al.
5,294,459 A 3/1994 Hogan et al.
5,306,447 A 4/1994 Harris et al.
5,322,221 A 6/1994 Anderson
5,335,000 A 8/1994 Stevens
5,343,434 A 8/1994 Noguchi
5,344,676 A 9/1994 Kim et al.
5,359,172 A 10/1994 Kozak et al.
5,366,559 A 11/1994 Periasamy
5,378,505 A 1/1995 Kubota et al.
5,378,508 A 1/1995 Castro et al.
5,393,613 A 2/1995 Mackay
5,398,193 A 3/1995 Deangelis
5,403,617 A 4/1995 Haaland
5,405,660 A 4/1995 Psiuk et al.
5,418,350 A 5/1995 Freneaux et al.
5,449,536 A 9/1995 Funkhouser
5,472,143 A * 12/1995 Bartels ...................... B05B 1/00 239/462
5,477,026 A 12/1995 Buongiorno
5,486,676 A 1/1996 Aleshin
5,491,317 A 2/1996 Pirl
5,495,105 A 2/1996 Nishimura et al.
5,512,745 A 4/1996 Finer et al.
5,518,680 A 5/1996 Cima et al.
5,524,828 A 6/1996 Raterman et al.
5,529,634 A 6/1996 Miyata et al.
5,547,094 A 8/1996 Bartels et al.
5,578,227 A 11/1996 Rabinovich
5,607,730 A 3/1997 Ranalli
5,609,921 A 3/1997 Gitzhofer et al.
5,612,099 A 3/1997 Thaler
5,614,252 A 3/1997 McMillan et al.
5,634,093 A 5/1997 Ashida et al.
5,648,127 A 7/1997 Turchan et al.
5,653,925 A 8/1997 Batchelder
5,676,719 A 10/1997 Stavropoulos et al.
5,697,046 A 12/1997 Conley
5,705,117 A 1/1998 O'Connor et al.
5,707,715 A 1/1998 Derochemont et al.
5,732,885 A 3/1998 Huffman
5,733,609 A 3/1998 Wang
5,736,195 A 4/1998 Haaland
5,742,050 A 4/1998 Amirav et al.
5,775,402 A 4/1998 Sachs et al.
5,746,844 A 5/1998 Sterett et al.
5,770,272 A 6/1998 Biemann et al.
5,772,106 A 6/1998 Ayers et al.
5,772,963 A 6/1998 Prevost et al.
5,772,964 A 6/1998 Prevost et al.
5,779,833 A 7/1998 Cawley et al.
5,795,388 A 8/1998 Oudard
5,814,152 A 9/1998 Thaler
5,837,960 A 11/1998 Lewis et al.
5,844,192 A 12/1998 Wright et al.
5,847,357 A 12/1998 Woodmansee et al.
5,849,238 A 12/1998 Schmidt et al.
5,854,311 A 12/1998 Richart

(56) References Cited

U.S. PATENT DOCUMENTS

| | | | |
|---|---|---|---|
| 5,861,136 | A | 1/1999 | Glicksman et al. |
| 5,882,722 | A | 3/1999 | Kydd |
| 5,894,403 | A | 4/1999 | Shah et al. |
| 5,940,099 | A | 8/1999 | Karlinski |
| 5,958,268 | A | 9/1999 | Engelsberg et al. |
| 5,965,212 | A | 10/1999 | Dobson et al. |
| 5,969,352 | A * | 10/1999 | French .................. H01J 49/105 250/288 |
| 5,980,998 | A | 11/1999 | Sharma et al. |
| 5,993,549 | A | 11/1999 | Kindler et al. |
| 5,993,554 | A | 11/1999 | Keicher et al. |
| 5,997,956 | A | 12/1999 | Hunt et al. |
| 6,007,631 | A | 12/1999 | Prentice et al. |
| 6,015,083 | A | 1/2000 | Hayes et al. |
| 6,021,776 | A | 2/2000 | Allred et al. |
| 6,025,037 | A | 2/2000 | Wadman et al. |
| 6,036,889 | A | 3/2000 | Kydd |
| 6,040,016 | A | 3/2000 | Mitani et al. |
| 6,046,426 | A | 4/2000 | Jeantette et al. |
| 6,056,994 | A | 5/2000 | Paz De Araujo et al. |
| 6,110,144 | A | 8/2000 | Choh et al. |
| 6,116,718 | A | 9/2000 | Peeters et al. |
| 6,136,442 | A | 10/2000 | Wong |
| 6,143,116 | A | 11/2000 | Hayashi et al. |
| 6,144,008 | A | 11/2000 | Rabinovich |
| 6,149,076 | A | 11/2000 | Riney |
| 6,151,435 | A | 11/2000 | Pilloff |
| 6,159,749 | A | 12/2000 | Liu |
| 6,169,605 | B1 | 1/2001 | Penn et al. |
| 6,176,647 | B1 | 1/2001 | Itoh |
| 6,182,688 | B1 | 2/2001 | Fabre |
| 6,183,690 | B1 | 2/2001 | Yoo et al. |
| 6,197,366 | B1 | 3/2001 | Takamatsu |
| 6,238,614 | B1 * | 5/2001 | Yang ...................... B33Y 10/00 264/497 |
| 6,251,488 | B1 | 6/2001 | Miller et al. |
| 6,258,733 | B1 | 7/2001 | Solayappan et al. |
| 6,265,050 | B1 | 7/2001 | Wong et al. |
| 6,267,301 | B1 | 7/2001 | Haruch |
| 6,268,584 | B1 | 7/2001 | Keicher et al. |
| 6,290,342 | B1 | 9/2001 | Vo et al. |
| 6,291,088 | B1 | 9/2001 | Wong |
| 6,293,659 | B1 | 9/2001 | Floyd et al. |
| 6,318,642 | B1 | 11/2001 | Goenka et al. |
| 6,328,026 | B1 | 12/2001 | Wang et al. |
| 6,340,216 | B1 | 1/2002 | Peeters et al. |
| 6,348,687 | B1 | 2/2002 | Brockmann et al. |
| 6,349,668 | B1 | 2/2002 | Sun et al. |
| 6,355,533 | B2 | 3/2002 | Lee |
| 6,379,745 | B1 | 4/2002 | Kydd et al. |
| 6,384,365 | B1 | 5/2002 | Seth et al. |
| 6,390,115 | B1 | 5/2002 | Rohwer et al. |
| 6,391,251 | B1 | 5/2002 | Keicher et al. |
| 6,391,494 | B2 | 5/2002 | Reitz et al. |
| 6,405,095 | B1 | 6/2002 | Jang et al. |
| 6,406,137 | B1 | 6/2002 | Okazaki et al. |
| 6,410,105 | B1 | 6/2002 | Mazumder et al. |
| 6,416,156 | B1 | 7/2002 | Noolandi et al. |
| 6,416,157 | B1 | 7/2002 | Peeters et al. |
| 6,416,158 | B1 | 7/2002 | Floyd et al. |
| 6,416,159 | B1 | 7/2002 | Floyd et al. |
| 6,416,389 | B1 | 7/2002 | Perry et al. |
| 6,454,384 | B1 | 9/2002 | Peeters et al. |
| 6,467,862 | B1 | 10/2002 | Peeters et al. |
| 6,471,327 | B2 | 10/2002 | Jagannathan et al. |
| 6,481,074 | B1 | 11/2002 | Karlinski |
| 6,486,432 | B1 | 11/2002 | Colby et al. |
| 6,503,831 | B2 | 1/2003 | Speakman |
| 6,513,736 | B1 | 2/2003 | Skeath et al. |
| 6,520,996 | B1 | 2/2003 | Manasas et al. |
| 6,521,297 | B2 | 2/2003 | McDougall et al. |
| 6,531,191 | B1 * | 3/2003 | Notenboom ........ C04B 41/0036 156/62.2 |
| 6,537,501 | B1 | 3/2003 | Holl et al. |
| 6,544,599 | B1 | 4/2003 | Brown et al. |
| 6,548,122 | B1 | 4/2003 | Sharma et al. |
| 6,564,038 | B1 | 5/2003 | Bethea et al. |
| 6,572,033 | B1 | 6/2003 | Pullagura et al. |
| 6,573,491 | B1 | 6/2003 | Marchitto et al. |
| 6,607,597 | B2 | 8/2003 | James et al. |
| 6,608,281 | B2 | 8/2003 | Ishide et al. |
| 6,636,676 | B1 | 10/2003 | Renn |
| 6,646,253 | B1 | 11/2003 | Rohwer et al. |
| 6,656,409 | B1 | 12/2003 | Keicher et al. |
| 6,697,694 | B2 | 2/2004 | Mogensen |
| 6,772,649 | B2 | 8/2004 | Zimmermann et al. |
| 6,774,338 | B2 | 8/2004 | Baker et al. |
| 6,780,377 | B2 | 8/2004 | Hall et al. |
| 6,811,744 | B2 | 11/2004 | Keicher et al. |
| 6,811,805 | B2 | 11/2004 | Gilliard et al. |
| 6,823,124 | B1 | 11/2004 | Renn et al. |
| 6,855,631 | B2 | 2/2005 | Kirby |
| 6,890,624 | B1 | 5/2005 | Kambe et al. |
| 6,921,626 | B2 | 7/2005 | Ray et al. |
| 6,998,345 | B2 | 2/2006 | Kirby |
| 6,998,785 | B1 | 2/2006 | Silfvast et al. |
| 7,009,137 | B2 | 3/2006 | Guo et al. |
| 7,045,015 | B2 | 5/2006 | Renn et al. |
| 7,108,894 | B2 | 9/2006 | Renn |
| 7,164,818 | B2 | 1/2007 | Bryan et al. |
| 7,171,093 | B2 | 1/2007 | Kringlebotn et al. |
| 7,178,380 | B2 | 2/2007 | Shekarriz et al. |
| 7,270,844 | B2 | 9/2007 | Renn |
| 7,294,366 | B2 | 11/2007 | Renn et al. |
| 7,402,897 | B2 | 7/2008 | Leedy |
| 7,469,558 | B2 | 12/2008 | Demaray et al. |
| 7,485,345 | B2 | 2/2009 | Renn et al. |
| 7,658,163 | B2 | 2/2010 | Renn et al. |
| 7,674,671 | B2 | 3/2010 | Renn et al. |
| 7,836,922 | B2 | 11/2010 | Poole et al. |
| 7,938,079 | B2 | 5/2011 | King et al. |
| 7,987,813 | B2 | 8/2011 | Renn et al. |
| 8,012,235 | B2 | 9/2011 | Takashima et al. |
| 8,383,014 | B2 | 2/2013 | Vandeusden et al. |
| 8,796,146 | B2 | 8/2014 | Renn et al. |
| 8,916,084 | B2 | 12/2014 | Chretien et al. |
| 8,919,899 | B2 | 12/2014 | Essien |
| 9,694,389 | B2 | 7/2017 | Fan et al. |
| 2001/0027011 | A1 | 10/2001 | Hanaoka et al. |
| 2001/0046551 | A1 | 11/2001 | Falck et al. |
| 2001/0046833 | A1 * | 11/2001 | Hashish .................... B24C 5/04 451/101 |
| 2002/0012743 | A1 | 1/2002 | Sampath et al. |
| 2002/0012752 | A1 | 1/2002 | McDougall et al. |
| 2002/0063117 | A1 | 5/2002 | Church et al. |
| 2002/0071934 | A1 | 6/2002 | Marutsuka |
| 2002/0082741 | A1 | 6/2002 | Mazumder et al. |
| 2002/0096647 | A1 | 7/2002 | Moors et al. |
| 2002/0100416 | A1 | 8/2002 | Sun et al. |
| 2002/0107140 | A1 | 8/2002 | Hampden-Smith et al. |
| 2002/0128714 | A1 | 9/2002 | Manasas et al. |
| 2002/0132051 | A1 | 9/2002 | Choy |
| 2002/0145213 | A1 | 10/2002 | Liu et al. |
| 2002/0162974 | A1 | 11/2002 | Orsini et al. |
| 2003/0003241 | A1 | 1/2003 | Suzuki et al. |
| 2003/0020768 | A1 | 1/2003 | Renn |
| 2003/0032214 | A1 * | 2/2003 | Huang ................ B29C 67/0059 438/50 |
| 2003/0048314 | A1 | 3/2003 | Renn |
| 2003/0108511 | A1 | 6/2003 | Sawhney |
| 2003/0108664 | A1 | 6/2003 | Kodas et al. |
| 2003/0117691 | A1 | 6/2003 | Bi et al. |
| 2003/0138967 | A1 | 7/2003 | Hall et al. |
| 2003/0149505 | A1 | 8/2003 | Mogensen |
| 2003/0175411 | A1 | 9/2003 | Kodas et al. |
| 2003/0180451 | A1 | 9/2003 | Kodas et al. |
| 2003/0202043 | A1 | 10/2003 | Moffat et al. |
| 2003/0219923 | A1 | 11/2003 | Nathan et al. |
| 2003/0228124 | A1 | 12/2003 | Renn et al. |
| 2004/0004209 | A1 | 1/2004 | Matsuba et al. |
| 2004/0029706 | A1 | 2/2004 | Barrera et al. |
| 2004/0038808 | A1 | 2/2004 | Hampden-Smith et al. |
| 2004/0080917 | A1 | 4/2004 | Steddom et al. |
| 2004/0151978 | A1 | 8/2004 | Huang |

(56) References Cited

U.S. PATENT DOCUMENTS

| | | | | |
|---|---|---|---|---|
| 2004/0179808 | A1 | 9/2004 | Renn | |
| 2004/0185388 | A1* | 9/2004 | Hirai | C09D 11/00 430/322 |
| 2004/0191695 | A1 | 9/2004 | Ray et al. | |
| 2004/0197493 | A1 | 10/2004 | Renn et al. | |
| 2004/0226929 | A1* | 11/2004 | Miura | B41M 3/006 219/121.85 |
| 2004/0227227 | A1 | 11/2004 | Imanaka et al. | |
| 2004/0247782 | A1 | 12/2004 | Hampden-Smith et al. | |
| 2005/0002818 | A1 | 1/2005 | Ichikawa | |
| 2005/0003658 | A1 | 1/2005 | Kirby | |
| 2005/0097987 | A1 | 5/2005 | Kodas et al. | |
| 2005/0101129 | A1 | 5/2005 | Lirby | |
| 2005/0110064 | A1 | 5/2005 | Duan et al. | |
| 2005/0129383 | A1 | 6/2005 | Renn et al. | |
| 2005/0133527 | A1 | 6/2005 | Dullea et al. | |
| 2005/0139156 | A1* | 6/2005 | Ahn | B01J 2/02 118/300 |
| 2005/0145968 | A1 | 7/2005 | Goela et al. | |
| 2005/0147749 | A1 | 7/2005 | Liu et al. | |
| 2005/0156991 | A1 | 7/2005 | Renn | |
| 2005/0163917 | A1 | 7/2005 | Renn | |
| 2005/0171237 | A1* | 8/2005 | Patel | C09D 11/36 523/160 |
| 2005/0184328 | A1 | 8/2005 | Uchiyama et al. | |
| 2005/0205415 | A1 | 9/2005 | Belousov et al. | |
| 2005/0205696 | A1 | 9/2005 | Saito et al. | |
| 2005/0214480 | A1 | 9/2005 | Garbar et al. | |
| 2005/0215689 | A1 | 9/2005 | Garbar et al. | |
| 2005/0220994 | A1* | 10/2005 | Mehta | B05D 1/025 427/180 |
| 2005/0238804 | A1 | 10/2005 | Garbar et al. | |
| 2005/0247681 | A1 | 11/2005 | Boillot et al. | |
| 2005/0275143 | A1 | 12/2005 | Toth | |
| 2006/0003095 | A1 | 1/2006 | Bullen et al. | |
| 2006/0008590 | A1 | 1/2006 | King et al. | |
| 2006/0035033 | A1 | 2/2006 | Tanahashi | |
| 2006/0043598 | A1 | 3/2006 | Kirby et al. | |
| 2006/0046347 | A1 | 3/2006 | Wood et al. | |
| 2006/0046461 | A1 | 3/2006 | Benson et al. | |
| 2006/0057014 | A1 | 3/2006 | Oda et al. | |
| 2006/0116000 | A1 | 6/2006 | Yamamoto | |
| 2006/0159899 | A1 | 7/2006 | Edwards et al. | |
| 2006/0162424 | A1 | 7/2006 | Shekarriz et al. | |
| 2006/0163570 | A1 | 7/2006 | Renn et al. | |
| 2006/0163744 | A1 | 7/2006 | Vanheusden et al. | |
| 2006/0172073 | A1 | 8/2006 | Groza et al. | |
| 2006/0175431 | A1 | 8/2006 | Renn et al. | |
| 2006/0189113 | A1* | 8/2006 | Vanheusden | B22F 1/0018 438/597 |
| 2006/0228465 | A1* | 10/2006 | Zurecki | C21D 1/613 427/8 |
| 2006/0233953 | A1 | 10/2006 | Renn et al. | |
| 2006/0269673 | A1* | 11/2006 | Yapel | B05C 5/0262 427/256 |
| 2006/0280866 | A1 | 12/2006 | Marquez et al. | |
| 2007/0019028 | A1 | 1/2007 | Renn et al. | |
| 2007/0128905 | A1 | 6/2007 | Speakman | |
| 2007/0154634 | A1* | 7/2007 | Renn | C03C 17/006 427/180 |
| 2007/0160837 | A1* | 7/2007 | Chikamori | B22F 1/0018 428/403 |
| 2007/0181060 | A1 | 8/2007 | Renn et al. | |
| 2007/0227536 | A1 | 10/2007 | Rivera et al. | |
| 2007/0240454 | A1 | 10/2007 | Brown | |
| 2008/0013299 | A1 | 1/2008 | Renn | |
| 2008/0016686 | A1* | 1/2008 | Lee | H05K 3/0014 29/846 |
| 2008/0099456 | A1 | 5/2008 | Schwenke et al. | |
| 2009/0039249 | A1 | 2/2009 | Wang et al. | |
| 2009/0061077 | A1 | 3/2009 | King et al. | |
| 2009/0061089 | A1 | 3/2009 | King et al. | |
| 2009/0090298 | A1 | 4/2009 | King et al. | |
| 2009/0114151 | A1 | 5/2009 | Renn et al. | |
| 2009/0229412 | A1 | 9/2009 | Takashima et al. | |
| 2009/0237449 | A1* | 9/2009 | Silverbrook | B41J 2/14427 347/40 |
| 2010/0029460 | A1* | 2/2010 | Shojiya | C03C 3/085 501/64 |
| 2010/0112234 | A1 | 6/2010 | Spatz et al. | |
| 2010/0140811 | A1* | 6/2010 | Leal | H01L 24/24 257/777 |
| 2010/0173088 | A1 | 7/2010 | King | |
| 2010/0192847 | A1 | 8/2010 | Renn et al. | |
| 2010/0255209 | A1 | 10/2010 | Renn et al. | |
| 2011/0129615 | A1 | 6/2011 | Renn et al. | |
| 2012/0038716 | A1 | 2/2012 | Hoerteis et al. | |
| 2013/0029032 | A1 | 1/2013 | King et al. | |
| 2013/0260056 | A1 | 10/2013 | Renn et al. | |
| 2013/0283700 | A1* | 10/2013 | Bajaj | B24B 37/26 51/295 |
| 2014/0027952 | A1 | 1/2014 | Fan et al. | |
| 2014/0035975 | A1* | 2/2014 | Essien | B41J 2/07 347/6 |
| 2014/0231266 | A1* | 8/2014 | Sherrer | B29C 67/0051 205/136 |
| 2014/0342082 | A1 | 11/2014 | Renn | |
| 2016/0172741 | A1* | 6/2016 | Panat | B22F 3/1055 29/600 |
| 2016/0193627 | A1* | 7/2016 | Essien | B41J 3/407 427/248.1 |
| 2017/0177319 | A1 | 6/2017 | Mark et al. | |

FOREIGN PATENT DOCUMENTS

| | | | |
|---|---|---|---|
| CN | 101111129 | | 1/2008 |
| DE | 19841401 | | 4/2000 |
| EP | 0331022 | A2 | 9/1989 |
| EP | 0444550 | A2 | 9/1991 |
| EP | 0470911 | | 7/1994 |
| EP | 1163552 | A1 | 12/2001 |
| EP | 1258293 | | 11/2002 |
| EP | 1452326 | | 9/2004 |
| EP | 14523262 | | 9/2004 |
| EP | 1507832 | A1 | 2/2005 |
| EP | 1670610 | | 6/2006 |
| GB | 2322735 | | 9/1998 |
| JP | 05318748 | | 12/1993 |
| JP | 8156106 | | 6/1996 |
| JP | 08156106 | | 6/1996 |
| JP | 2001507449 | | 6/2001 |
| JP | 2002539924 | | 11/2002 |
| JP | 3425522 | | 7/2003 |
| JP | 2004122341 | | 4/2004 |
| JP | 2006051413 | | 2/2006 |
| JP | 2007507114 | | 3/2007 |
| KR | 20000013770 | | 3/2000 |
| KR | 1002846070000 | | 8/2001 |
| KR | 1020070008614 | | 1/2007 |
| KR | 1020070008621 | | 1/2007 |
| KR | 1020070019651 | | 2/2007 |
| TW | 200636091 | | 10/2006 |
| WO | 9218323 | | 10/1992 |
| WO | 9633797 | | 10/1996 |
| WO | 9738810 | | 10/1997 |
| WO | 0023825 | | 4/2000 |
| WO | 0069235 | | 11/2000 |
| WO | 0183101 | A1 | 11/2001 |
| WO | 2005075132 | A1 | 8/2005 |
| WO | 2006041657 | A2 | 4/2006 |
| WO | 2006065978 | | 6/2006 |
| WO | 2006076603 | | 7/2006 |
| WO | 2013010108 | | 1/2013 |
| WO | 2013162856 | | 10/2013 |

OTHER PUBLICATIONS

Odde, et al., "Laser-Based Guidance of Cells Through Hollow Optical Fibers", The American Society for Cell Biology Thirty-Seventh Annual Meeting, Dec. 17, 1997.

(56) References Cited

OTHER PUBLICATIONS

Odde, et al., “Laser-guided direct writing for applications in biotechnology”, Trends in Biotechnology, Oct. 1999, 385-389.
Rao, et al., “Aerodynamic Focusing of Particles in Viscous Jets”, J. Aerosol Sci., 1993, 879-892.
Renn, et al., “Evanescent-wave guiding of atoms in hollow optical fibers”, Physical Review A, Feb. 1996, R648-R651.
Renn, et al., “Flow- and Laser-Guided Direct Write of Electronic and Biological Components”, Direct-Write Technologies for Rapid Prototyping Applications, 2002, 475-492.
Renn, et al., “Laser-Guidance and Trapping of Mesoscale Particles in Hollow-Core Optical Fibers”, Physical Review Letters, Feb. 15, 1999, 1574-1577.
Renn, et al., “Laser-Guided Atoms in Hollow-Core Optical Fibers”, Physical Review Letters, Oct. 30, 1995, 3253-3256.
Renn, et al., “Optical-dipole-force fiber guiding and heating of atoms”, Physical Review A, May 1997, 3684-3696.
Renn, et al., “Particle Manipulation and Surface Patterning by Laser Guidance”, Submitted to EIPBN ’98, Session AM4, 1998.
Renn, et al., “Particle manipulation and surface patterning by laser guidance”, Journal of Vacuum Science & Technology B, Nov./Dec. 1998, 3859-3863.
Sobeck, et al., Technical Digest: 1994 Solid-State Sensor and Actuator Workshop, 1994, 647.
Stratasys, “FDM Technology”, http://www.stratasys.com/3d-printers/technologies/fdm-technology, 2015.
Stratasys, “PolyJet Technology”, http://www.stratasys.com/3d-printers/technologies/polyjet-technology, 2015.
TSI Incorporated, “Flow a Virtual Impactor Works”, www.tsi.com, Sep. 21, 2001.
Vanheusden, et al., “Direct Printing of Interconnect Materials for Organic Electronics”, IMAPS ATW Printing for an Intelligent Future, Mar. 8-10, 2002, 1-5.
Vanheusden, et al., “Direct Printing of Interconnect Materials for Organic Electronics”, IMAPS ATW, Printing an Intelligent Future, Mar. 8-10, 2002, 1-5.
Wikipedia, “Continuous Liquid Interface Production”, https://www.en.wikipedia.org/wiki/Continuous_Liquid_Interface_Production, Sep. 29, 2015.
Wikipedia, “Selective laser sintering”, https://en.wikipedia.org/wiki/Selective_laser_sintering, Nov. 23, 2015.
Wikipedia, “Stereolithography”, https://en/wikipedia/org/wiki/Stereolithography, Feb. 4, 2016.
Zhang, et al., “A Numerical Characterization of Particle Beam Collimation by an Aerodynamic Lens-Nozzle System: Part I. An Individual Lens or Nozzle”, Aerosol Science and Technology, 2002, 617-631.
Websters Ninth New Collegiate Dictionary, 1990, 744.
Ashkin, “Acceleration and Trapping of Particles by Radiation Pressure”, Physical Review Letters, Jan. 26, 1970, 156-159.
Ashkin, “Optical trapping and manipulation of single cells using infrared laser beams”, Nature, Dec. 1987, 769-771.
Dykhuizen, “Impact of High Velocity Cold Spray Particles”, May 13, 2000, 1-18.
Fernandez De La Mora, et al., “Aerodynamic focusing of particles in a carrier gas”, J. Fluid Mech., 1988, 1-21.
Gladman, et al., “Biomimetic 4D printing”, Nature Materials, vol. 15, Macmillan Publishers Limited, Jan. 25, 2016, 413-418.
Harris, et al., “Marangoni Effects on Evaporative Lithographic Patterning of Colloidal Films”, Langmuir, Vo. 24, No. 8, American Chemical Society, Mar. 4, 2008, 3681-3685.
King, et al., “M3D TM Technology: Maskless Mesoscale TM Materials Deposition”, Optomec pamphlet, 2001.
Krassenstein, “Carbon3D Unveils Breakthrough Clip 3D Printing Technology, 25-100X Faster”, http://3dprint.com/51566/carbon3d-clip-3d-printing, Mar. 16, 2015.
Lewandowski, et al., “Laser Guiding of Microscopic Particles in Hollow Optical Fibers”, Announcer 27, Summer Meeting—Invited and Contributed Abstracts, Jul. 1997, 89.
Lewis, “Novel Inks for Direct-Write Assembly of 3-D Periodic Structures”, Material Matters, vol. 3, No. 1, Aldrich Chemistry Company, 2008, 4-9.
Marple, et al., “Inertial, Gravitational, Centrifugal, and Thermal Collection Techniques”, Aerosol Measurement: Principles, Techniques and Applications, 2001, 229-260.
Miller, et al., “Maskless Mesoscale Materials Deposition”, HDI, Sep. 2001, 1-3.
Nanodimension, “The DragonFly 2020 3D Printer”, http://www.nano-di.com/3d-printer, 2015.
Nordson, “Fluid Dispensing Systems and Equipment”, http://www.nordson.com/en/divisions/asymtek/products/fluid-dispensing-systems?nor_division_facet_b=f65ab511444f4ce087bae3fb19491a82, 2015.
Nscrypt, “3D Printing”, http://nscrypt.com/3d-printing, 2015.
Nscrypt, “3DN HP Series”, http://www.nscrypt.com/3d-printing, 2015.
Nscrypt, “3DN Series”, http://www.nscrypt.com/3d-printing, 2015.
Nscrypt, “nFD Specification Sheet”, http://www.nscrypt.com/3d-printing, 2015.
Nscrypt, “SmartPump 100 Specification Sheet”, http://www.nscrypt.com/3d-printing, 2015.

* cited by examiner

FABRICATION OF THREE DIMENSIONAL STRUCTURES BY IN-FLIGHT CURING OF AEROSOLS

CROSS-REFERENCE TO RELATED APPLICATIONS

This application claims priority to and the benefit of the filing of U.S. Provisional Patent Application Ser. No. 62/114,354, entitled "MICRO 3D PRINTING", filed on Feb. 10, 2015, and the specification and claims thereof are incorporated herein by reference.

BACKGROUND OF THE INVENTION

Field of the Invention (Technical Field)

The present invention is related to the fabrication of 3D electrical and mechanical structures, microstructures, and nanostructures by in-flight curing of aerosol jetted nanoparticle and polymeric inks.

Background Art

Note that the following discussion may refer to a number of publications and references. Discussion of such publications herein is given for more complete background of the scientific principles and is not to be construed as an admission that such publications are prior art for patentability determination purposes.

Three-dimensional printing is a rapidly evolving technology which promises to revolutionize additive manufacturing. With 3D printing, various structural materials such as plastics and metals can be fabricated into net-shaped structures without the need for subtractive machining or etching steps. There is little materials waste and the reduced processing steps promise to make 3D printing a cost-effective, green technology. Several 3D printing technologies are currently available today and it is useful to briefly compare these technologies to the current invention.

Stereolithography is an additive manufacturing process that works by focusing an ultraviolet (UV) laser on to a vat of photopolymer resin. With the help of computer aided manufacturing or computer aided design (CAM/CAD) software, the UV laser is used to draw a pre-programmed design or shape on to the surface of the photopolymer vat. Because photopolymers are photosensitive under ultraviolet light, the irradiated resin is solidified and forms a single layer of the desired 3D object. This process is repeated for each layer of the design until the 3D object is complete. Layer resolution of 50-150 um is typically with lateral dimension approaching 10 um. The process is generally limited to photopolymer materials and sacrificial structures are required to support overhangs.

Ink jet technologies are typically used to print graphitic and pigmented inks in 2D. Recent materials innovations enable ink jet printers to jet polymeric and metal nanoparticle inks. Generally the inks used in ink jet printing must have relatively low viscosity, meaning the inks will spread substantially after printing, thus limiting the minimum feature size and aspect ratio of the printed features. The ink jetter does not contact the substrate, but it is in close proximity (less than mm).

Extrusion technologies are popular for 3D printing of thermoplastic polymers. In this case, a thermal plastic is heated to the melting point in a nozzle and extruded onto a substrate. The plastic rapidly cools and solidifies on contacting the substrate, and a three-dimensional shape can be maintained. 3D parts are typically fabricated layer wise, with each layer consisting of a raster pattern of extruded filament. Overhangs can be fabricated by extruding a sacrificial support material and later dissolving or mechanically removing the support structure. Typically feature sizes are hundreds of microns, and materials are largely limited to thermoplastics and a few thermoset polymers, as well as conductive pastes. The nScrypt tool is capable of printing on 3D surfaces by robotic CAD/CAM control of the nozzle positioning.

SUMMARY OF THE INVENTION (DISCLOSURE OF THE INVENTION)

The present invention is a method for fabricating a three-dimensional structure on a substrate, the method comprising propelling aerosol droplets from a deposition head toward the substrate, partially modifying a property of the aerosol droplets in-flight, and fully modifying the property of the aerosol droplets once they have been deposited as part of the three-dimensional structure. Modifying a property optionally comprises curing, for example ultraviolet (UV) light curing, or solidifying using electromagnetic radiation. In this embodiment aerosol droplets preferably comprise a photocurable polymer, and the fabricated three-dimensional structure comprises a cured polymer. The aerosol droplets optionally comprise solid particles dispersed in the photocurable polymer, and the fabricated three-dimensional structure comprises a cured polymer comprising embedded solid particles. The solid particles optionally comprise a ceramic, a metal, a fiber, or silicon. In another embodiment, the aerosol droplets comprise a solvent and modifying a property comprises evaporating the solvent. These aerosol droplets optionally comprise metal nanoparticles, in which case the method preferably further comprises irradiating the aerosol droplets with UV radiation, heating the metal nanoparticles, and heating the aerosol droplets sufficiently to at least partially evaporate the solvent. The method preferably further comprises continuing to irradiate the metal nanoparticles after they have been deposited, thereby at least partially sintering the metal nanoparticles.

The method optionally comprises tilting or translating the deposition head with respect to the substrate. The method optionally comprises fabricating an overhanging structure without requiring a sacrificial support or tilting the deposition head or the substrate. The standoff distance between the deposition head and the substrate is preferably at least 1 mm, and more preferably at least 2 mm. The method preferably comprises increasing the viscosity of the aerosol droplets in-flight, and preferably comprises irradiating the aerosol droplets with electromagnetic radiation in-flight and after the aerosol droplets have been deposited, optionally from more than one direction in-flight. The method optionally comprises heating the aerosol droplets with electromagnetic radiation in-flight and after the aerosol droplets have been deposited. The fabricated three-dimensional structure optionally comprises a structure selected from the group consisting of a micron-scale surface texture, a mechanical interposer, a precision spacer, a mechanical interposer comprising embedded electrical connectors, an enclosed, hollow structure, a mechanical scaffold, and a functional electrical wire.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF EMBODIMENTS OF THE INVENTION

The present invention is a method of making three-dimensional structures, such as structures comprising high aspect ratio features, using in-flight curing of aerosols and inks, and direct printing of liquid materials to fabricate three-dimensional, free standing, complex structures. Specifically, embodiments of the present invention combine patented Aerosol Jet dispensing technology, such as that described in U.S. Pat. Nos. 7,674,671, 7,938,079, and 7,987,813, with an in-flight materials processing mechanism that enables liquid droplets to partially solidify before depositing on a surface. After the in-flight processing, the droplets can be deposited to form free standing structures. Some of the advantages of this approach include ultra-high resolution three-dimensional (3D) printing, with features sizes down to 10 microns, lateral feature resolution to 1 micron, and vertical resolution to 100 nm. The aspect ratio of the free standing structures can be more than 100, and the structures can be printed on nearly any surface and surface geometry by manipulating the tilt and location of the print head relative to those surfaces. Overhangs and closed cells can be printed directly, without using sacrificial support materials. Both metal and insulating materials can be processed, which enables the co-deposition of electronic materials for fabricating circuits in 3D. Furthermore, composite materials can be printed, which allow for the tailoring of the mechanical and electrical properties of the 3D structures. Ultraviolet (UV) polymers can be cured in-flight as they are impacting on the target, and low sintering temperatures enable metallization of plastics. Using an Aerosol Jet process, practically any type of material and/or solvent can be printed. The large standoff from the substrate (typically a few millimeters) for this process enables high aspect printing without any z-axis motion. Sub-10 micron focusing of the aerosol jet enables creation of ultrafine features.

Figure 1:
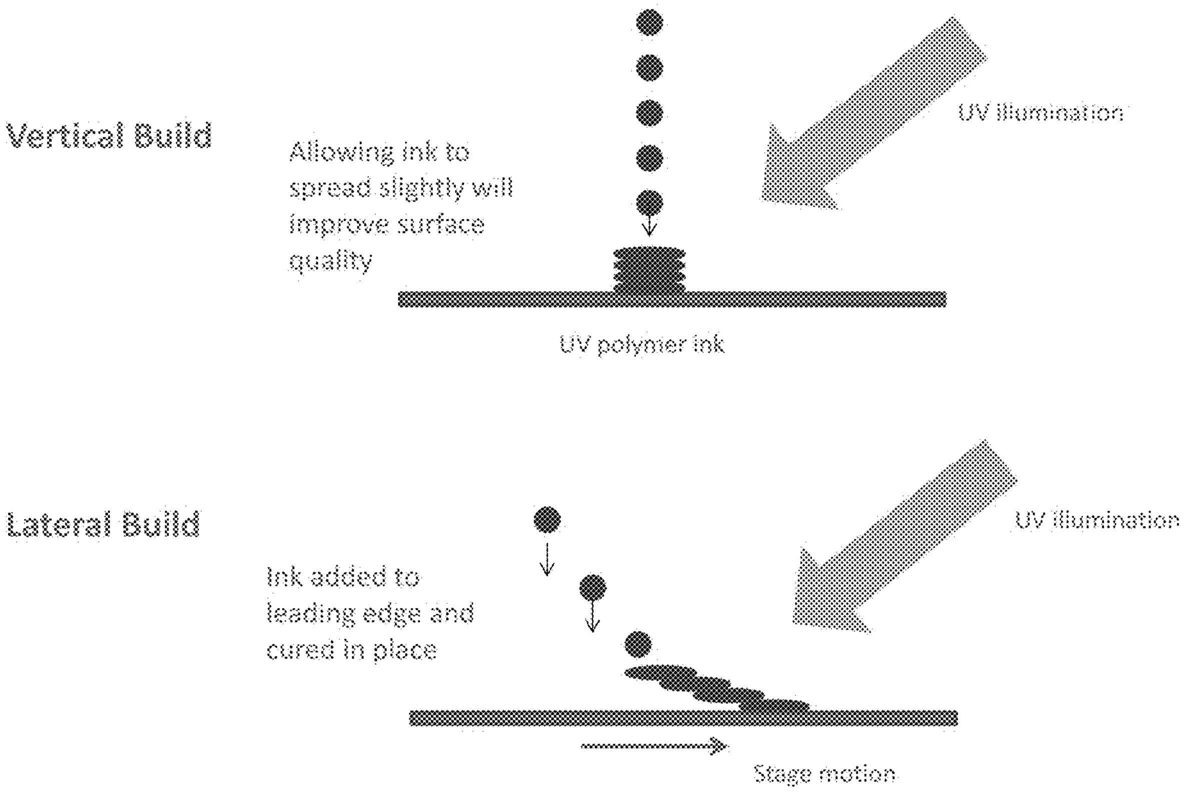
FIG. 1 is a schematic illustrating a mechanism for three-dimensional printing with aerosol jets.

Aerosol Jet printing is a non-contact, aerosol-based jetting technology. The starting inks are formulated with low viscosity (0.5 to 1000 cP) and in the typical process they are first aerosolized into a fine droplet dispersion of 1-5 um diameter droplets. Preferably nitrogen gas entrains the droplets and propels them through a fine nozzle (0.1-1 mm inner diameter) to a target substrate for deposition. A co-flowing, preferably nitrogen sheath gas focuses the droplet jet down to a 10 um diameter, which allows features of this size to be printed. The jetting technology is notable for the large standoff distance between the nozzle and substrate (several mm), the fine resolution (feature width 10 um), volumetric dispense accuracy (10 femptoliter), and wide range of material compatibility. Because of the large standoff distance, it is possible to dry and/or otherwise cure the droplets during their flight to the substrate. In doing so, the viscosity of the droplets can be increased much beyond the starting viscosity. With higher viscosity, the printed inks are self supporting and can be built up into free standing columns and other high aspect ratio features. In order to increase the viscosity, UV light from either a lamp or a UV LED is preferably applied to the interstitial region between the nozzle exit and the target substrate, as shown in FIG. 1. If the starting ink comprises a photopolymer with an absorption band overlapping the UV emission spectrum, the UV light can either fully or partially cure the photopolymer droplet in-flight, thereby increasing the viscosity.

FIG. 1 is a schematic illustrating a mechanism for three-dimensional printing with aerosol jets. Micro 3D structures are manufactured preferably by using Aerosol Jet compatible low viscosity photocurable resins, which are preferably printed using Aerosol Jet technology. Electromagnetic radiation, in this case ultraviolet light, illuminates and partially cures the droplets mid-flight. The partial curing increases the viscosity of the droplets, which in turn limits the spreading of the deposit on the substrate. The droplets coalesce on the target substrate and then fully cure. The top schematic shows the droplets stacking vertically. The lower schematic shows the droplets building an overhang structure as the substrate is translated beneath the print head. Up to 45 degree overhangs have been demonstrated, although even greater angles may be achieved.

Figure 2A:
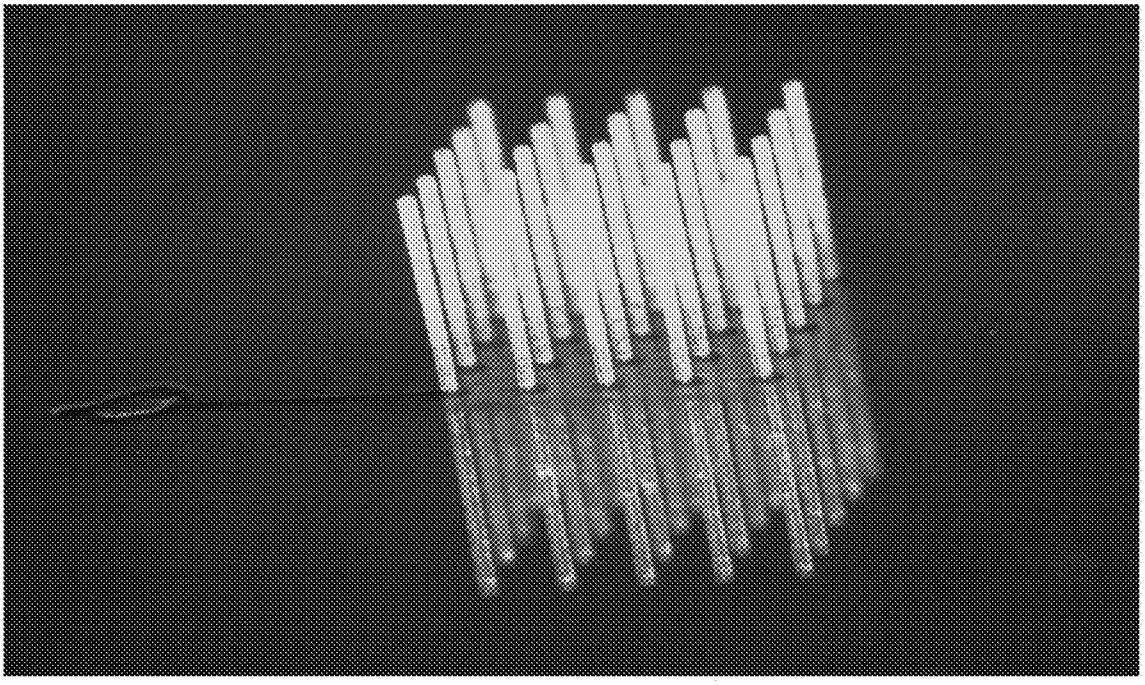
FIGS. 2A-2C are images of an array of polymer posts printed according to an embodiment of the present invention.
Figure 2B:
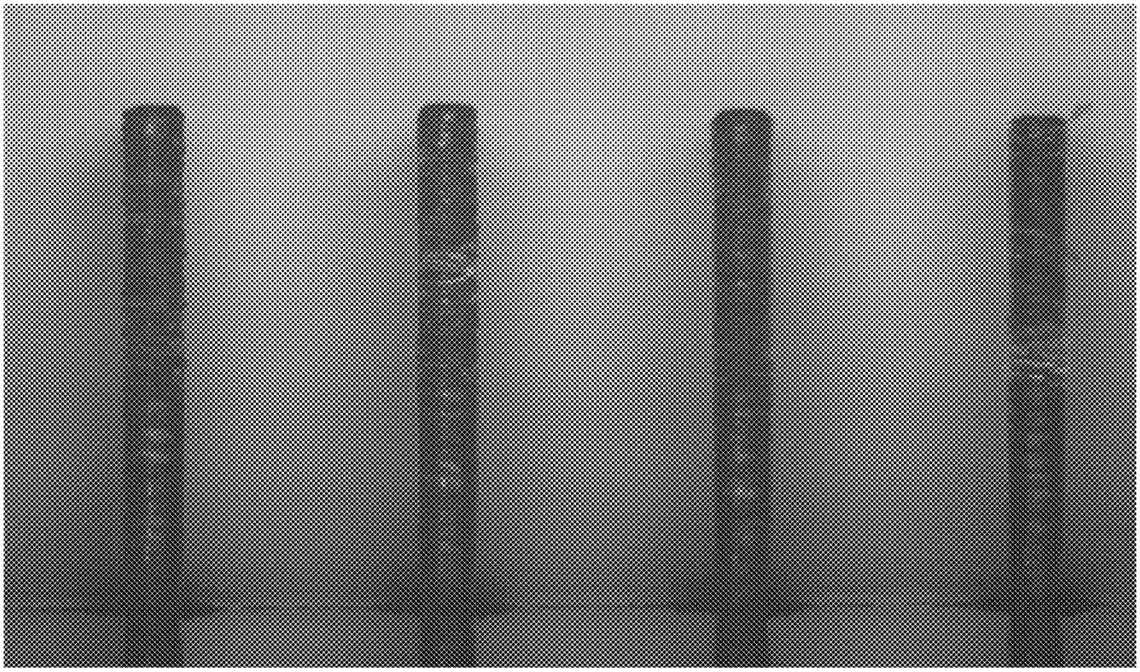
Figure 2C:
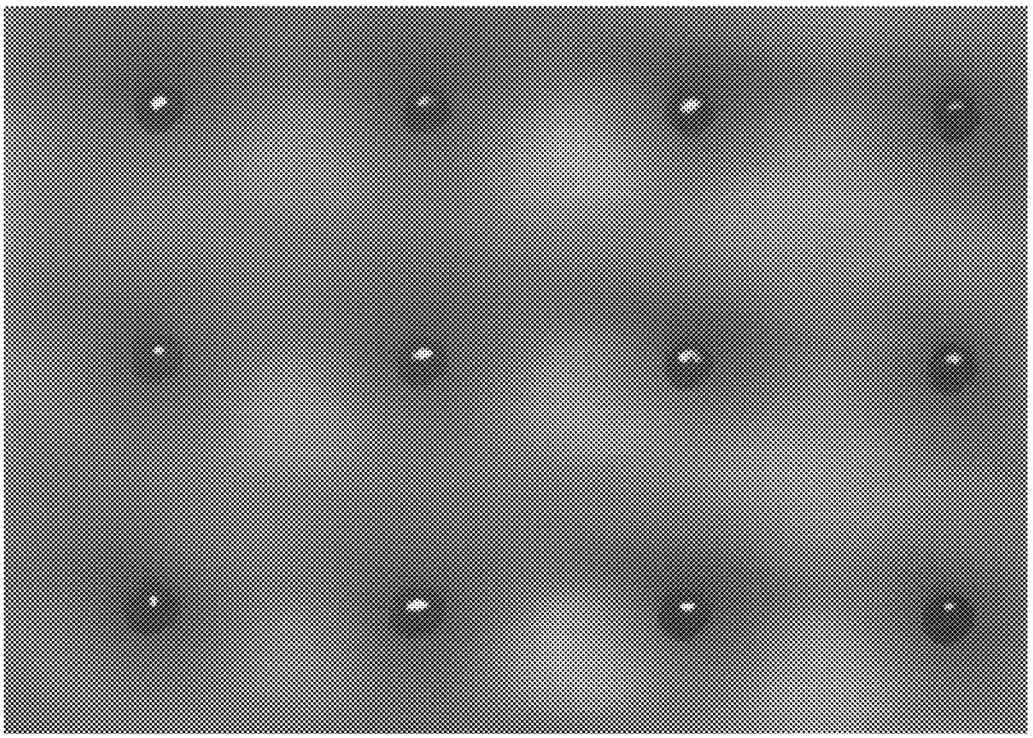
Figure 2D:
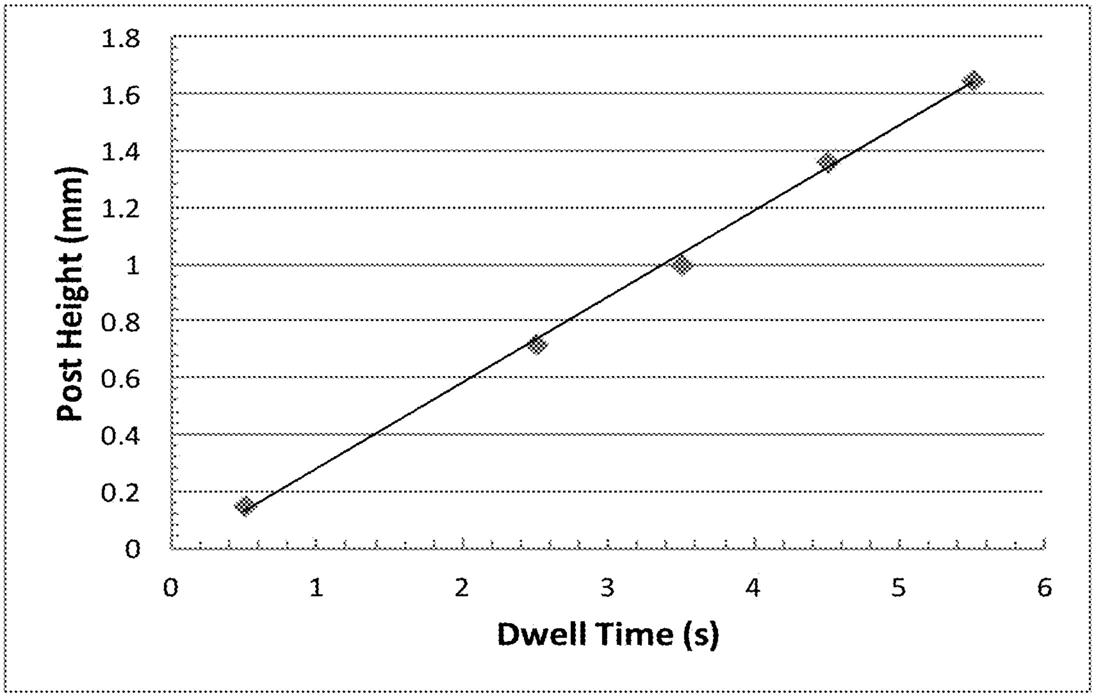
FIG. 2D is a graph showing the post build rate.

FIG. 2A is a photograph of vertical polymer posts printed with Loctite 3104 acrylic urethane and simultaneous UV LED curing. The incident UV power was 0.65 mW, the UV wavelength was 385 nm and volumetric print rate was 7.5 nL/s. The posts can extend from the target substrate substantially to the aerosol jet nozzle outlet. FIG. 2B is a magnified image of the post array; the post height is 1.0 mm, the height variation is 1%, the spacing is 0.5 mm, and diameter is 90 μm. FIG. 2C is an image of the top surface of the post array. The top of each post has a rounded, nearly hemispherical shape. FIG. 2D is a graph showing the measured build rate of a single post. The post height was found to be proportional to time when the print nozzle was stationary at a given location. The variation in height is approximately 1%, or alternatively approximately 10 μm for a 1.0 mm tall post.

Figure 3:
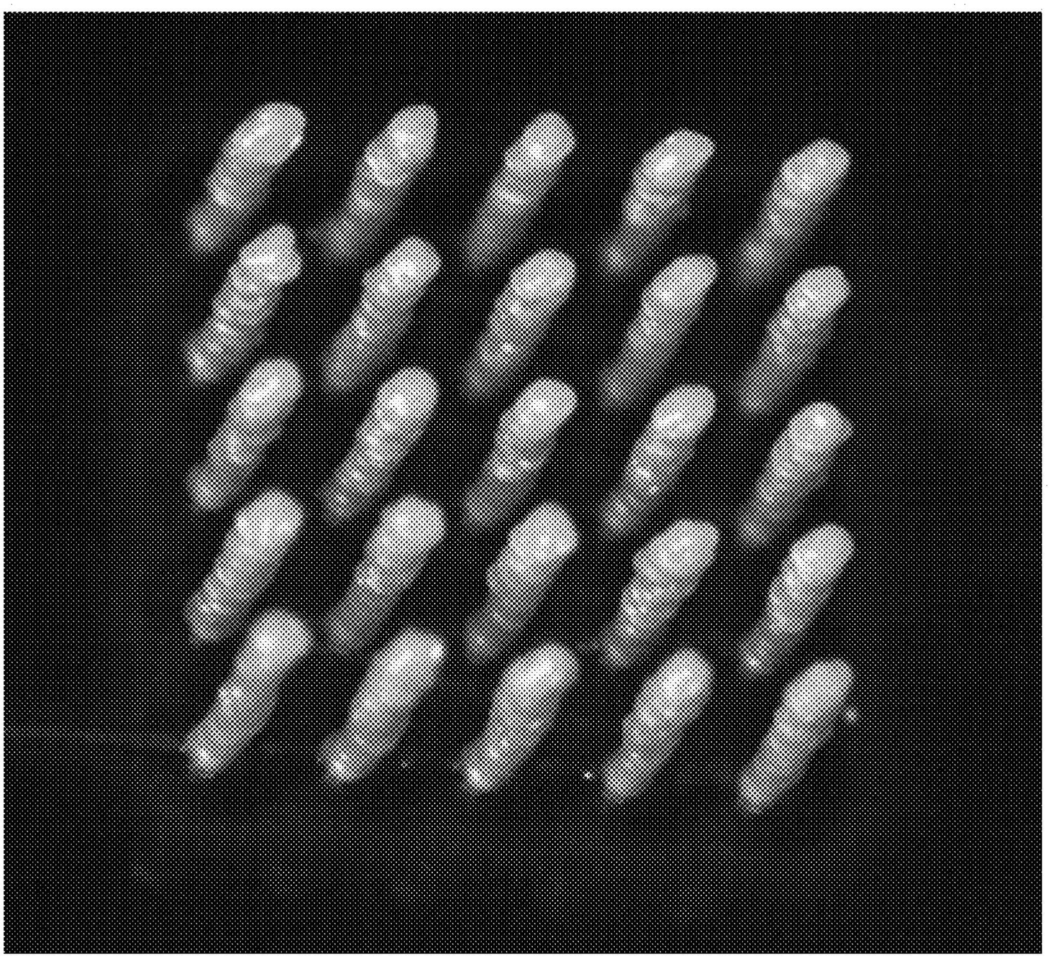
FIG. 3 is an image of an array of composite posts.

In-flight processing is also possible when solid particles, such as ceramics, metals, or fibers, are dispersed in the photopolymer ink. In this case, the cured photopolymer serves as a 3D mechanical support for the solid particles. The mechanical and electrical properties of this composite material can be optimized by, for example, providing wear and abrasion resistance, as well as forming 3D electrical conductors. FIG. 3 is an image of an array of composite posts. Silicon powder, having a particle size of less than 500 nm, was dispersed in a UV photopolymer resin at a concentration of 7% by volume. The composite dispersion was then printed and cured in-flight to produce solid posts of cured resin with embedded silicon. The post diameter is 120 μm and the height is 1.1 mm. Composite materials are desirable for optimizing mechanical and electrical properties of a 3D structure. In this example the composition material is sufficiently transparent to the UV light that it is fully cured, even with single sided UV illumination. At greater concentrations and with highly absorbing particles, the composite resin may be opaque to the incident light. In that case, it may be necessary to illuminate the printing area from opposite sides, or illuminate the deposit with a ring lamp. As long as the UV resin is curing near the outer surface of the 3D structure, sufficient mechanical support will allow the structure to build vertically. The photopolymer can optionally be removed in a post-processing step, such as by heating the 3D structure to beyond the evaporation or decomposition point of the photopolymer.

Figure 4A:
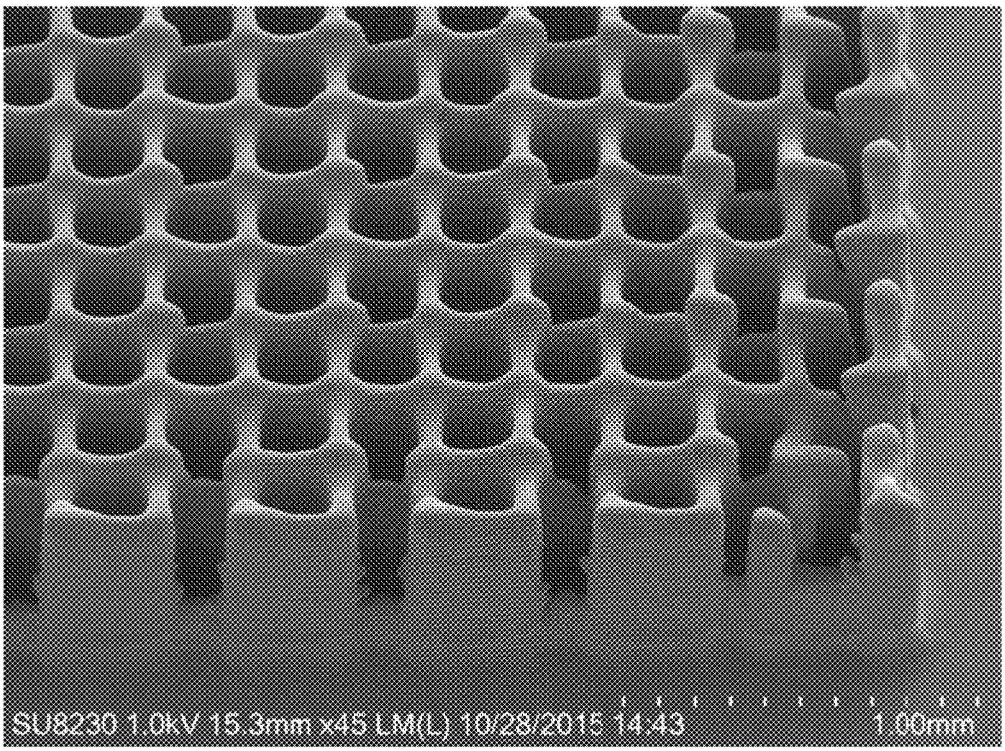
FIGS. 4A and 4B are perspective and top views, respectively, of an interposer printed in accordance with an embodiment of the present invention.
Figure 4B:
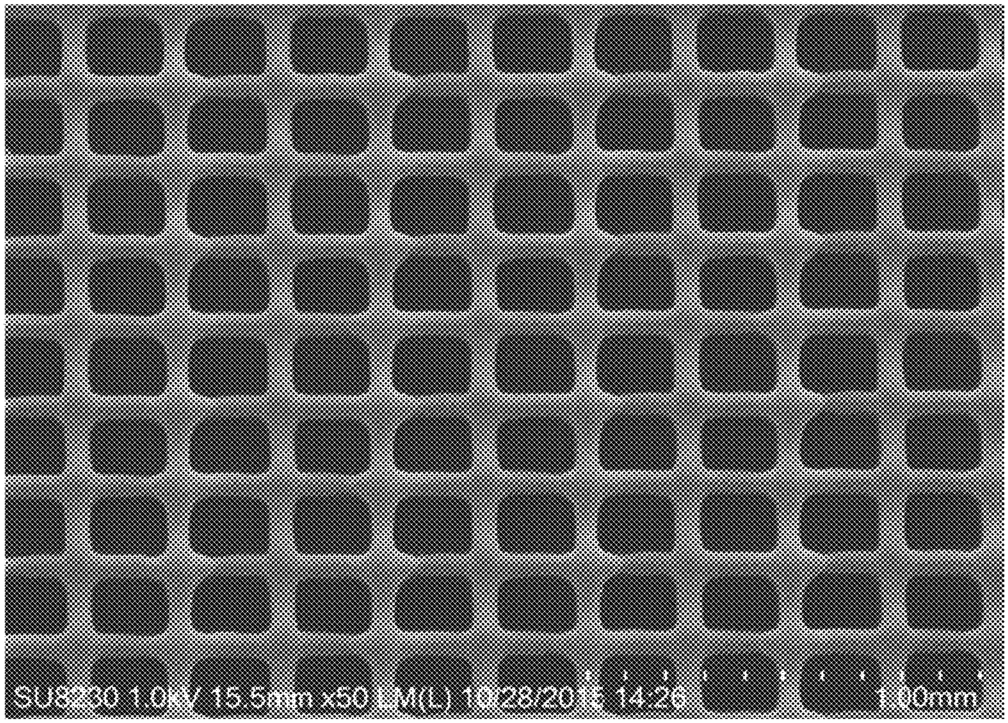

FIG. 4 shows images of a printed mechanical interposer, which is an element that provides structural support and precision spacing between two separated components. The interposer was printed by stacking multiple layers of UV resin, as can be seen in the perspective view of FIG. 4A. FIG. 4B shows the top surface grid pattern. In some embodiments an interposer can provide electrical or fluidic routing between one element or connection to another, in which case the interstitial spaces could be filled with conductive material or fluids.

Figure 5A:
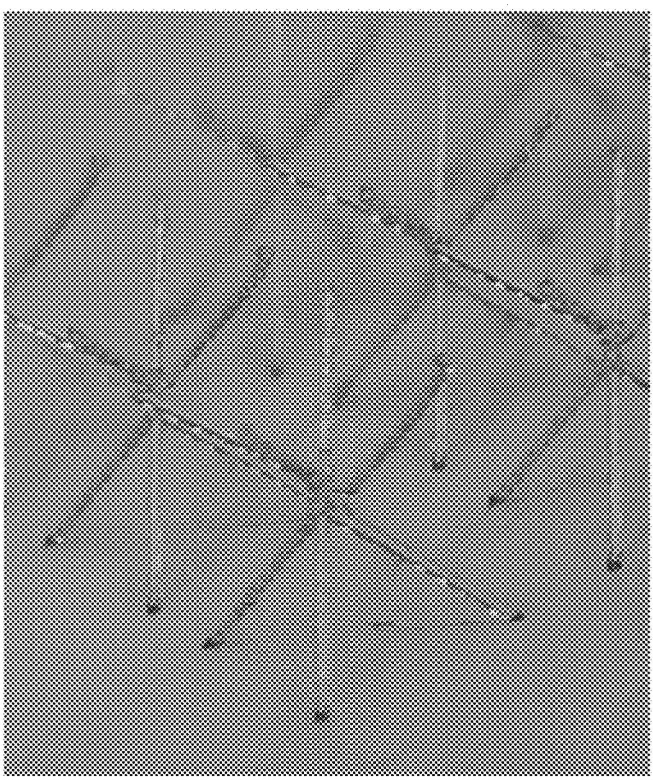
FIG. 5A shows three-dimensional jack-like structures printed using the offset approach shown in FIG. 1.
Figure 5B:
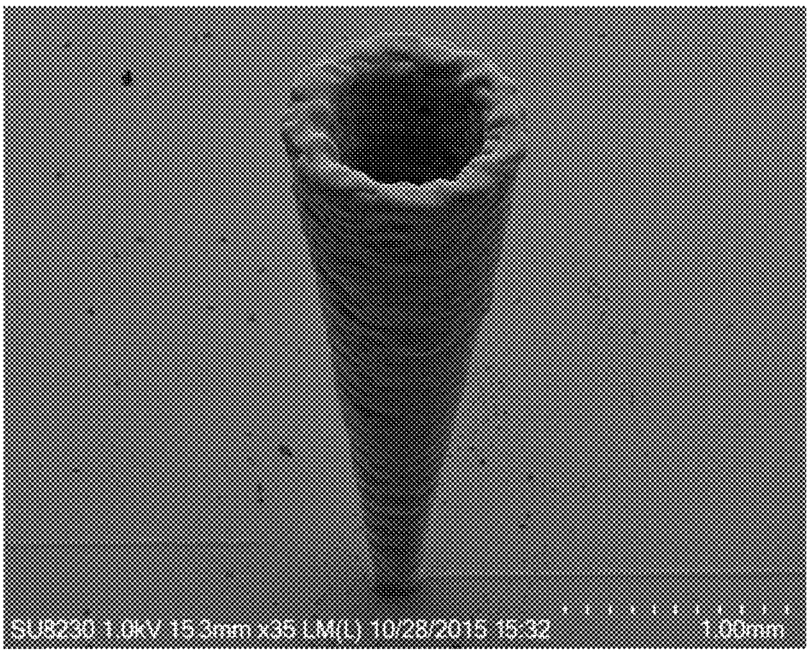
FIG. 5B shows an open cone structure.

FIG. 5A shows three-dimensional jack-like structures printed using the offset approach shown in FIG. 1. The lower 4 legs were printed while translating the print head in x- and y-directions to a vertex point. The angled post is at an approximate 45 degree angle with respect to the substrate. The top legs were printed by translating the print head away from the vertex. The overall height is 4 mm and the individual post diameters are 60 μm. FIG. 5B shows an open cone structure. This was printed by translating the stage in a repeating circular motion with increasing radius. If desired the cone could be closed by continuing the circular motion and decreasing the radius to zero.

Figure 6A:
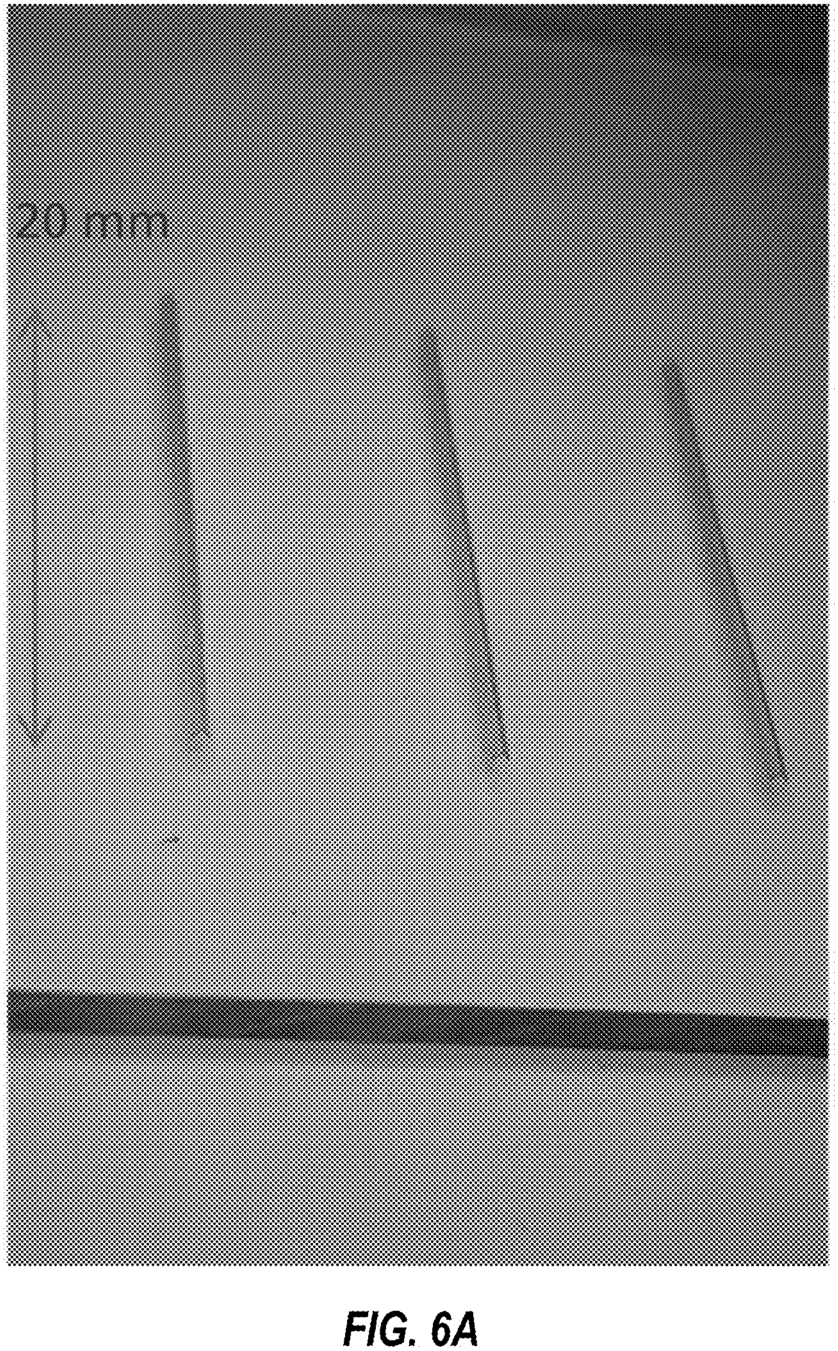
FIGS. 6A and 6B show a closed channel having an open interior along the length.
Figure 6B:
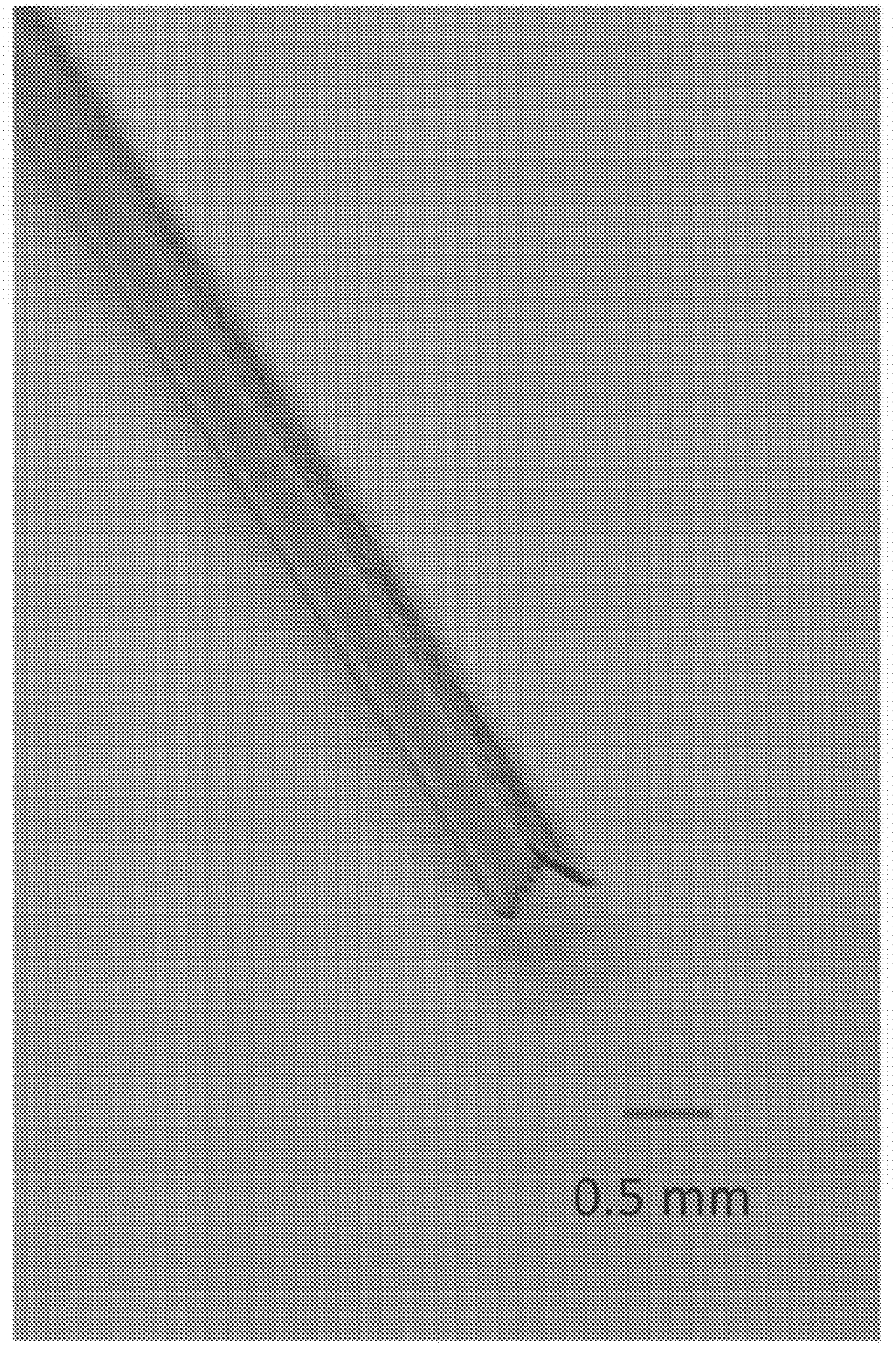
Figure 6C:
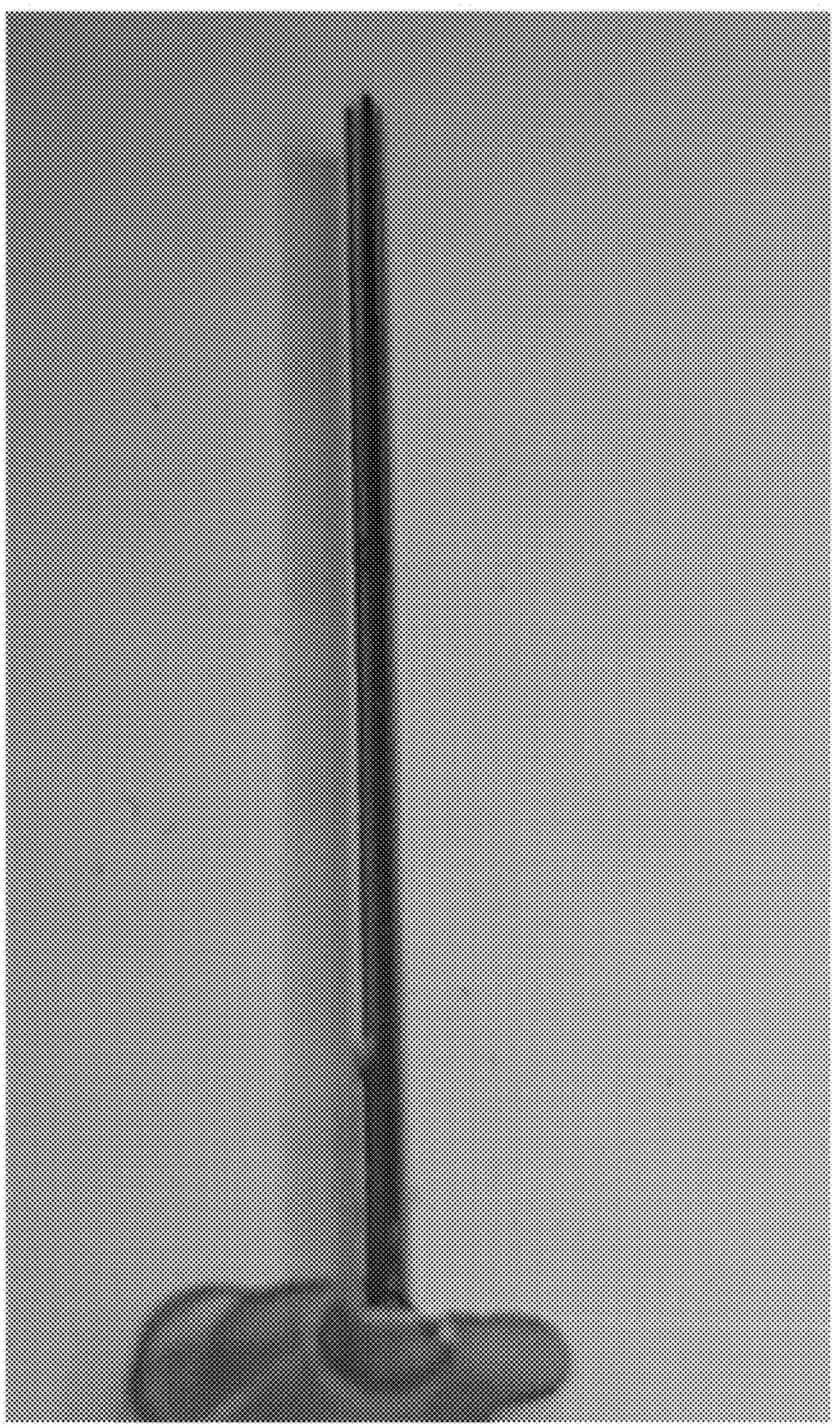
FIG. 6C shows ink flowing on the inside of the channel.

FIGS. 6A and 6B show a closed channel having an open interior along the length. Each sidewall of the channel was printed by stacking lines of photocurable polymer and sequentially offsetting by approximately ½ of a linewidth. This process resulted in a wall tilted at approximately 45 degrees in the direction of the offset. By offsetting in opposite directions, the walls touch at the midpoint. FIG. 6C depicts a drop of pigmented ink placed near the entrance to a channel, which is seen to be pulled through the channel by surface tension forces. This demonstrates that the channel is enclosed along the length but the channel is completely open from end to end.

Figure 7A:
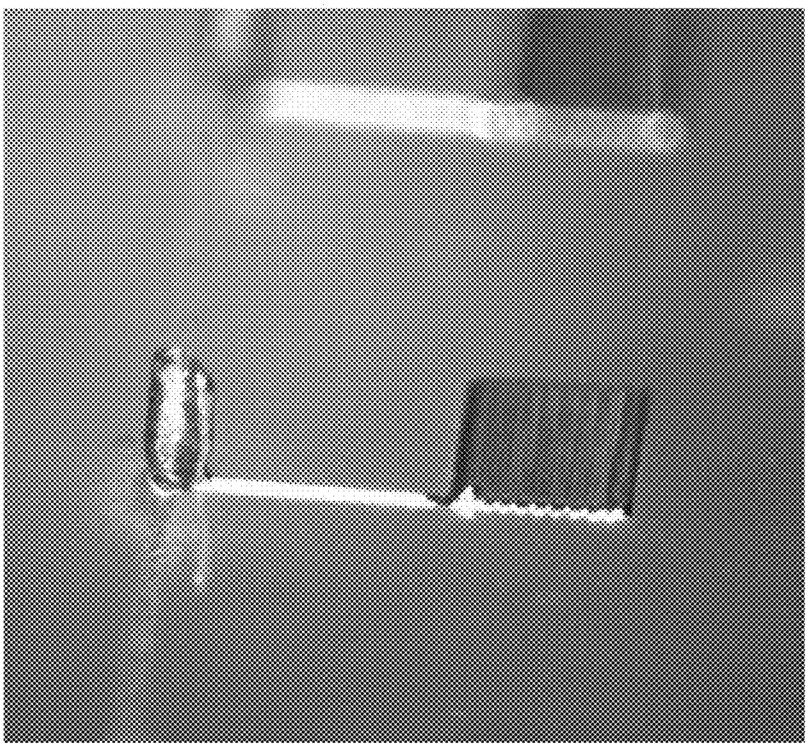
FIGS. 7A and 7B show an individual antenna and an array of antennas, respectively, having an L-shape printed post.
Figure 7B:
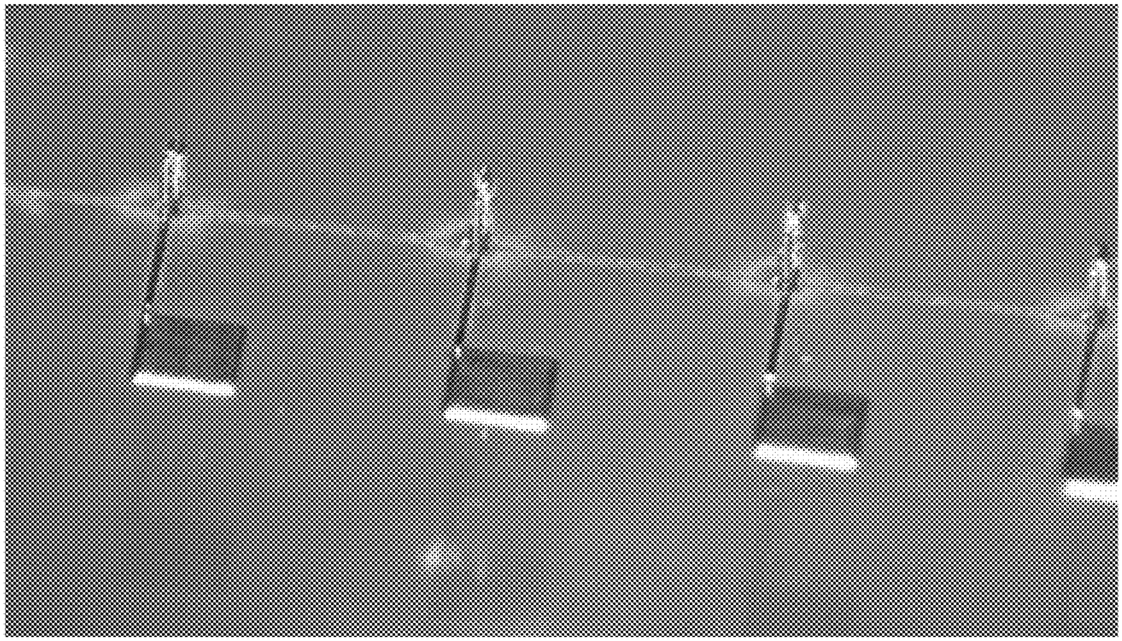
Figure 7C:
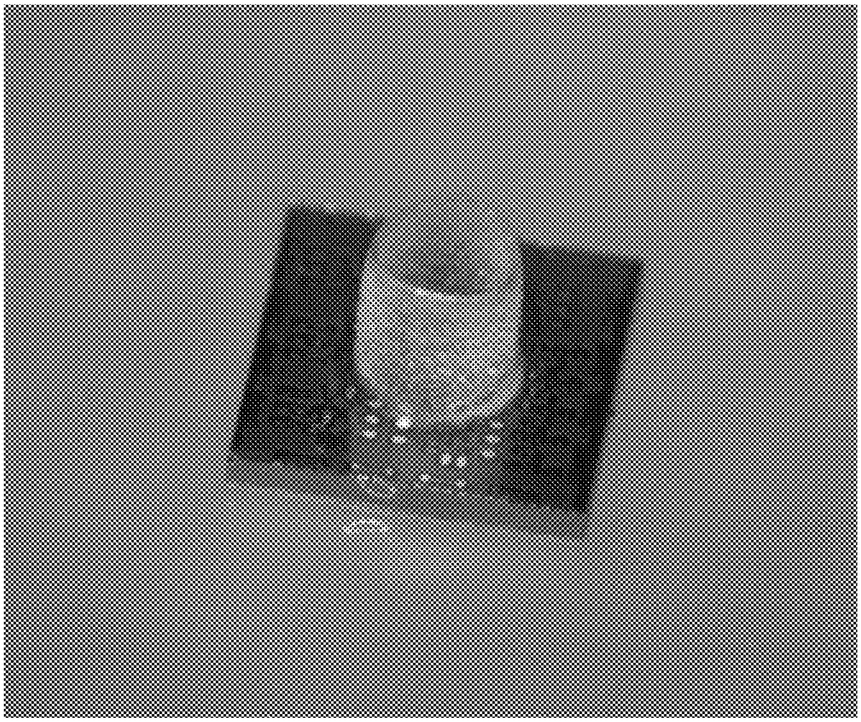
FIGS. 7C and 7D are images of 3D electrical components printed on a microchip.
Figure 7D:
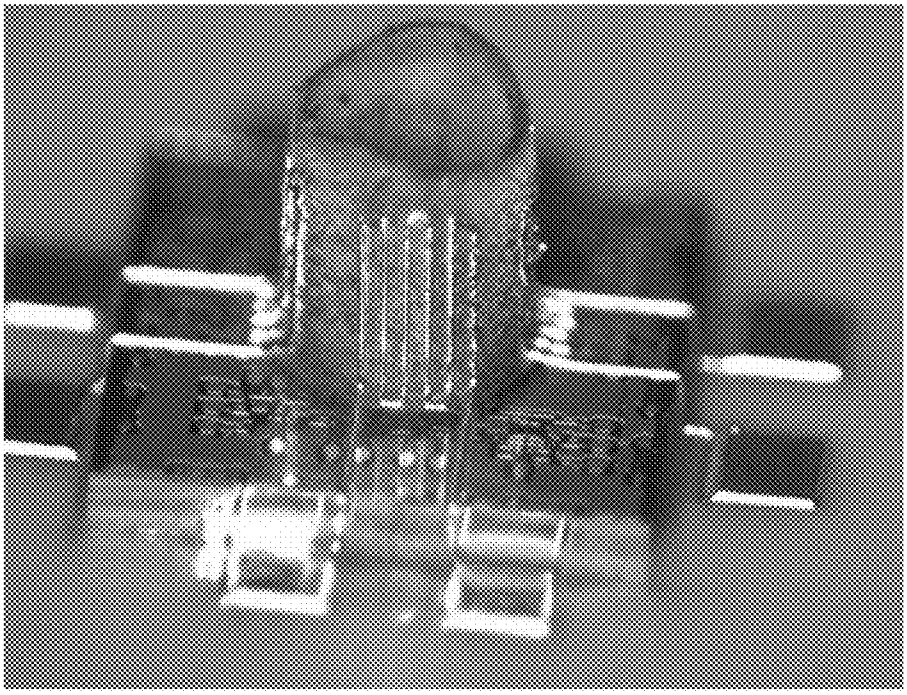

FIG. 7A shows a photocured post used as a mechanical support for an electrical component. The polymer post was fabricated using the process in FIG. 1 and it is approximately 1 mm tall by 0.1 mm wide. Silver ink was printed on the sidewall of the post and substrate by tilting the print head at 45 degrees with respect to each. The silver ink has low viscosity during printing and consequently will spread slightly on the substrate. By providing a mechanical support, the silver ink can be printed in three dimensions along the surface of the support. After printing, the silver ink was thermally sintered in a box oven at 150° C. for 60 minutes. The resulting conductive pattern serves as a freestanding, millimeter wave dipole antenna. FIG. 7B shows an array of micro-antennas. FIGS. 7C and 7D are images of 3D electrical components printed on a microchip. The process of the present invention eliminates complicated connections and waveguides that would otherwise have to be built into a package. This example shows that functional devices such as 3D electrical components (for example, heaters, antenna, and interconnects) can be printed directly on a driver chip.

Figure 8A:
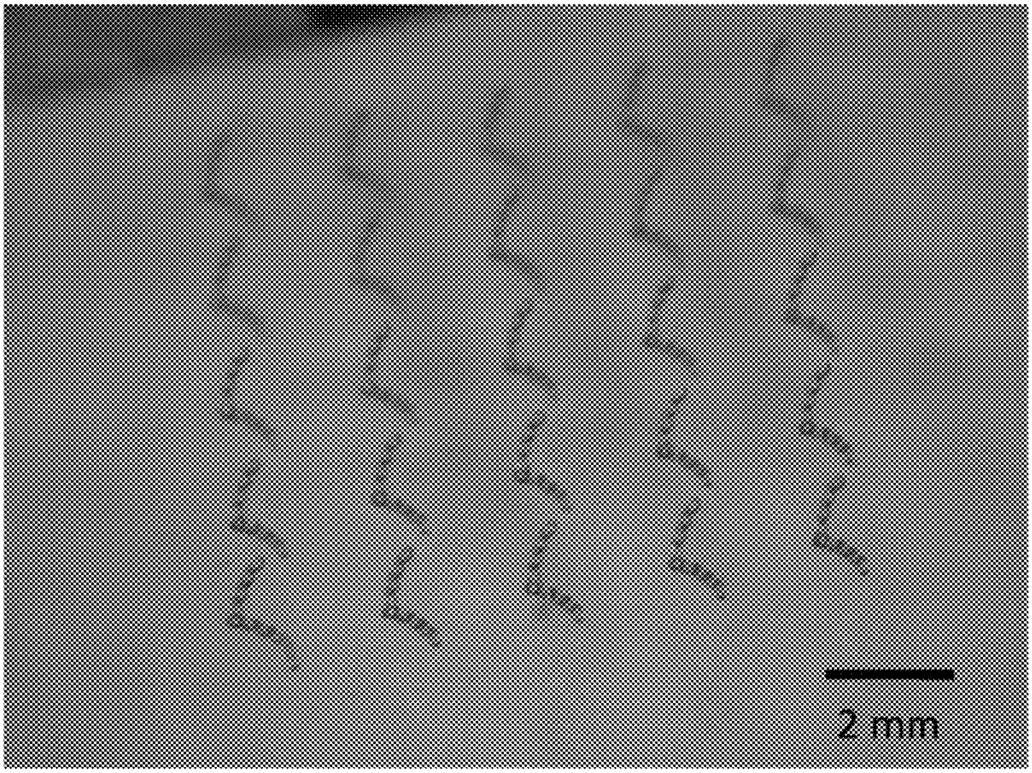
FIG. 8A shows freestanding polymer springs fabricated by tilting the print head during printing.
Figure 8B:
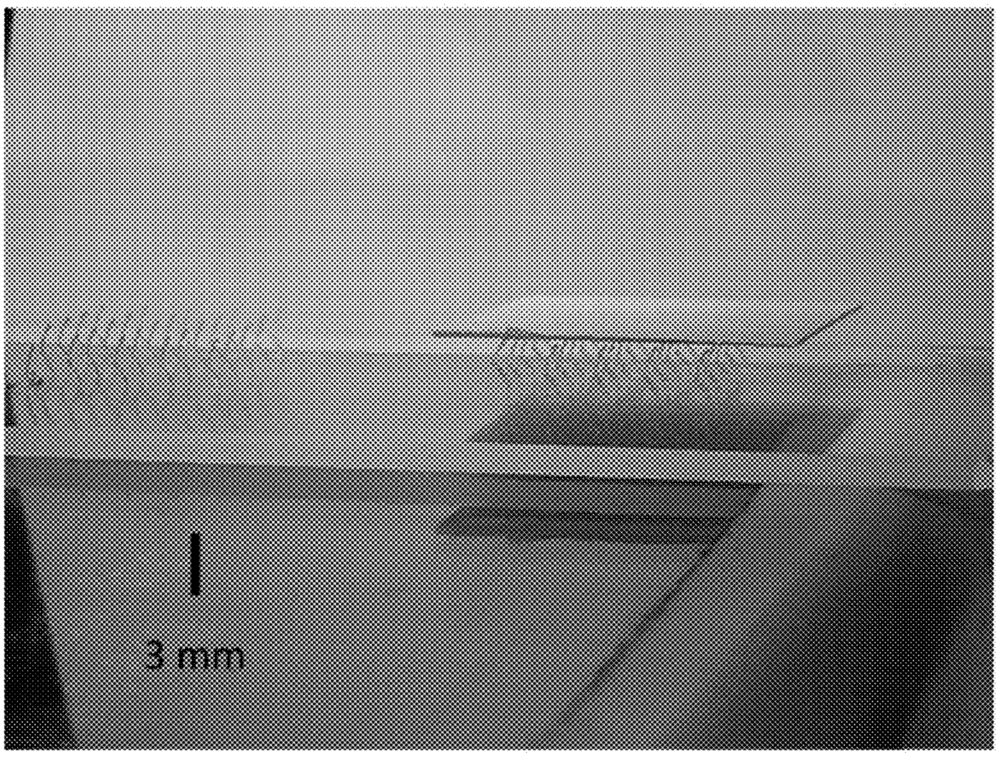
FIG. 8B shows the springs supporting a mass.

FIG. 8A shows freestanding polymer springs fabricated by tilting the print head during printing. The print head was tilted from 0° to −30° and back to 0° during build of each spring. FIG. 8B depicts a demonstration showing that the spring array can support a mechanical mass. In contrast to the vertical posts described previously, the springs provide a flexible interposer connection between two surfaces.

Figure 9A:
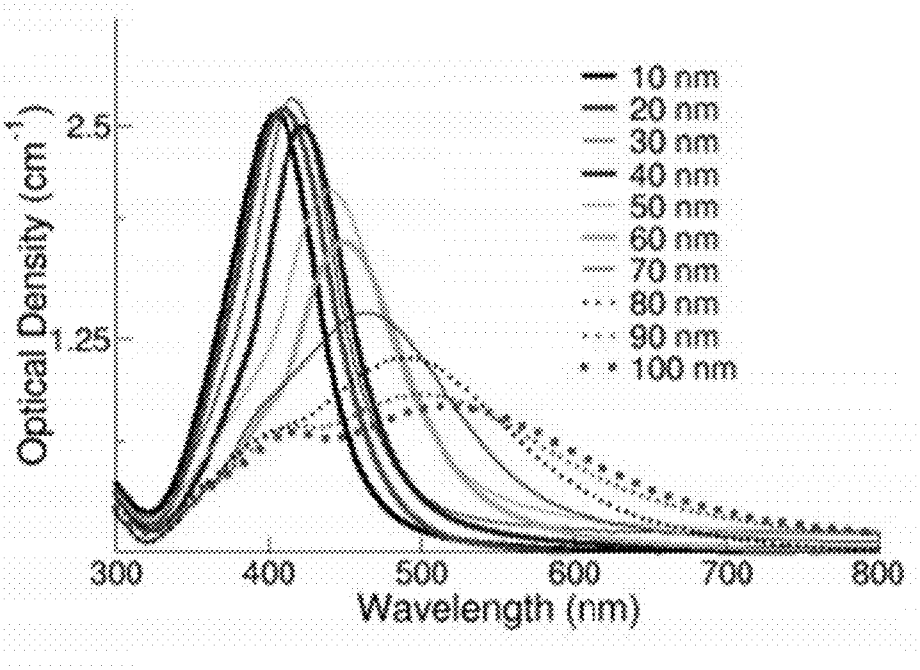
FIG. 9A is a graph showing the optical density of silver nanoparticles.
Figure 9B:
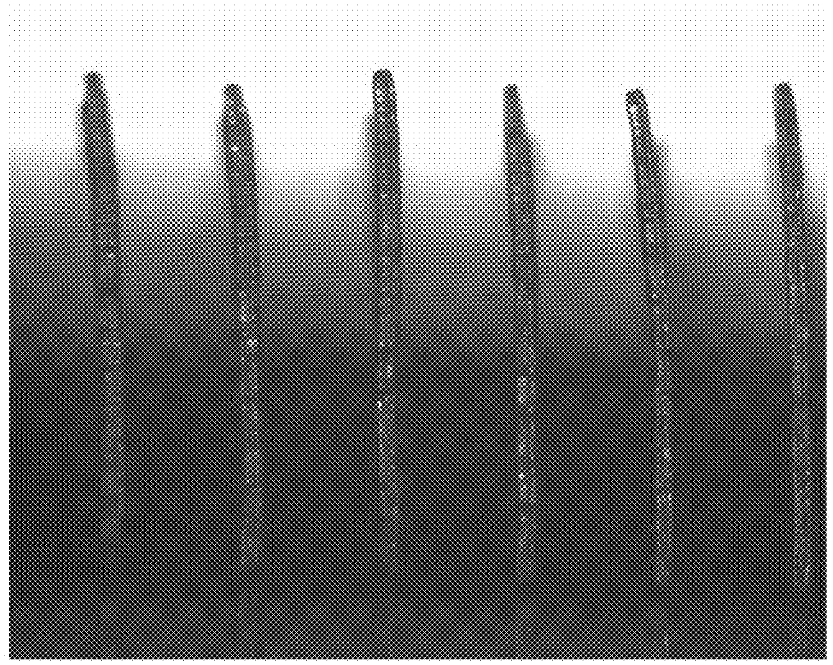
FIG. 9B shows a 3D silver wire array printed with the in-situ illumination method.

In the case of solvent based inks, such as metal nanoparticle dispersions, the droplet viscosity can be increased by partially or fully drying the droplet during flight. Since metal nanoparticles are known to be highly absorbing to UV light, exposing the droplets to UV illumination will heat the nanoparticles and accelerate the solvent evaporation. FIG. 9 shows such an extension of the in-situ curing process to non-photocurable materials. FIG. 9A is a graph showing the increasing optical density (i.e. absorption spectra) of silver nanoparticles at UV wavelengths as the particle size decreases. The curves are strongly peaked around 410 nm, but the absorption edge extends into the visible, making the in-flight processing possible with common UV LED and Hg lamps. Ink droplets comprising silver nanoparticles dispersed in a solvent can thus be heated by absorbing UV light at wavelengths near 400 nm. If heated in-flight, the solvent will largely evaporate and result in a highly concentrated silver drop when it impacts on a surface. The metal nanoparticle droplets can retain their 3D shape, both because the carrier solvent is evaporated and also because the particles are partially sintered. The now higher viscosity silver droplets can be stacked in 3D, similar to the stacking of the photopolymer. Further illumination after printing, which heats the nanoparticles beyond the level required for evaporating the solvent, will cause the nanoparticles to at least partially sinter and become conductive. FIG. 9B shows a 3D silver wire array printed with the in-situ illumination method. The wire width is 40 μm and the height is 0.8 mm. The wires are slightly bent due to the fact that only single sided illumination was used, which causes the wires to be heated more on the illumination side, leading to asymmetrical shrinkage.

Figure 10A:
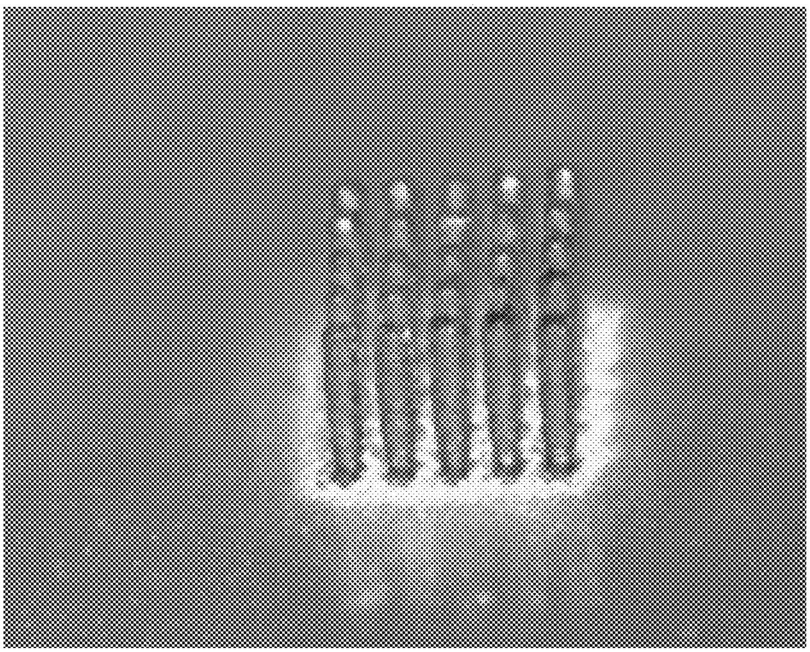
FIGS. 10A-10F are images of various 3D shapes printed using UV polymers and on-the-fly curing.
Figure 10B:
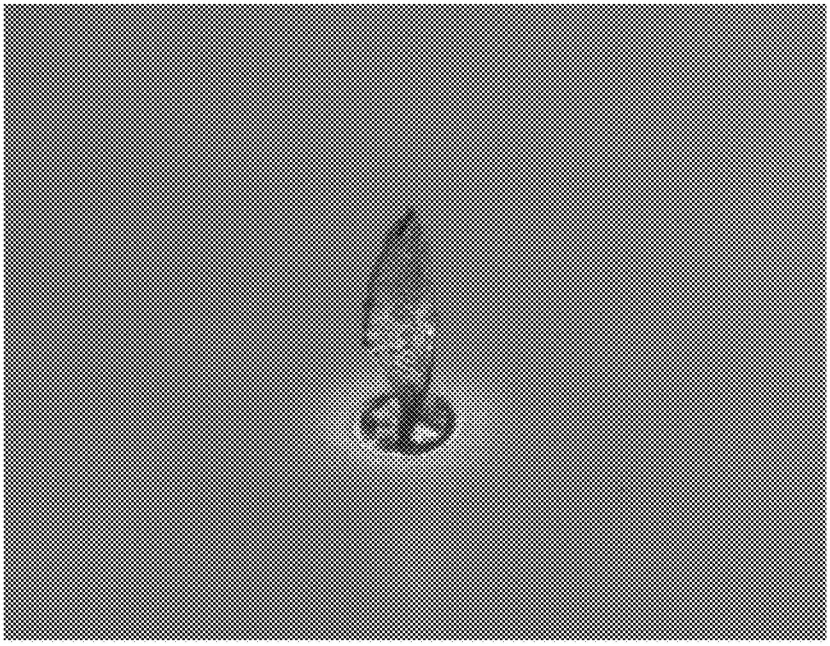
Figure 10C:
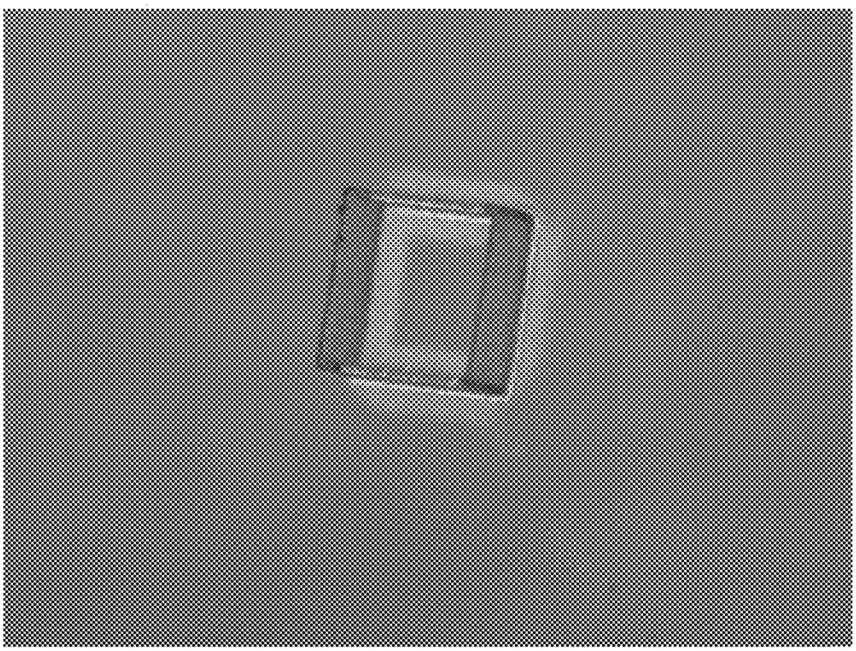
Figure 10D:
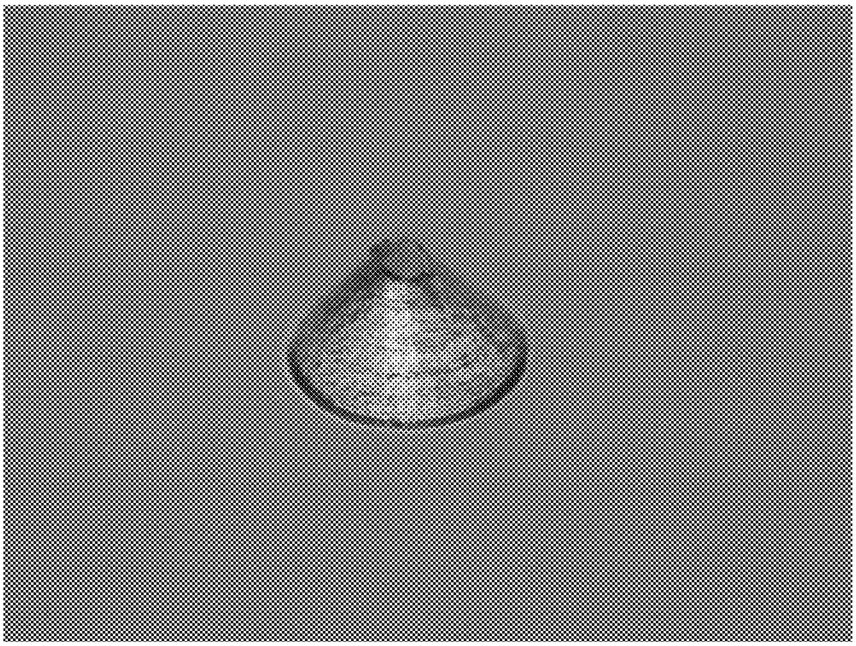
Figure 10E:
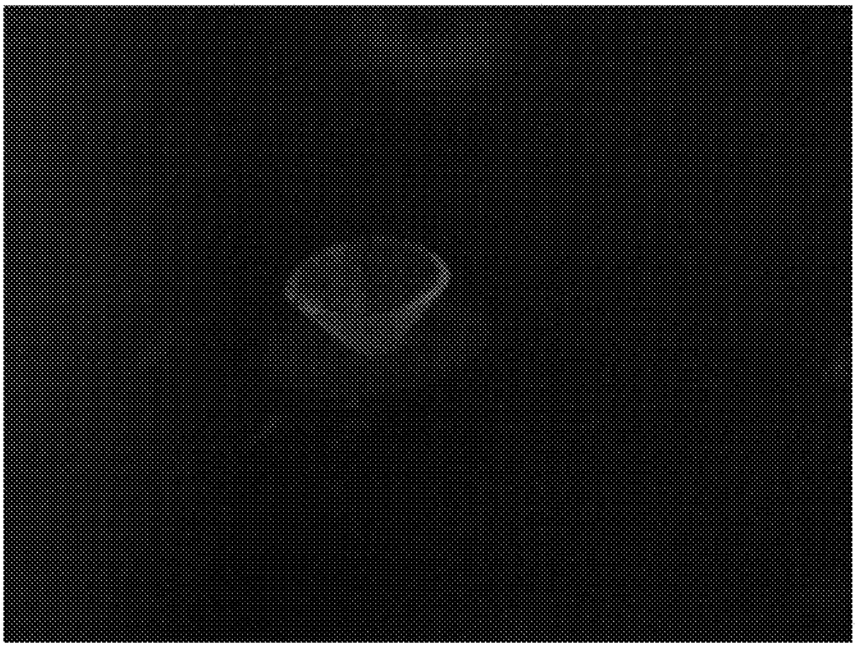
Figure 10F:
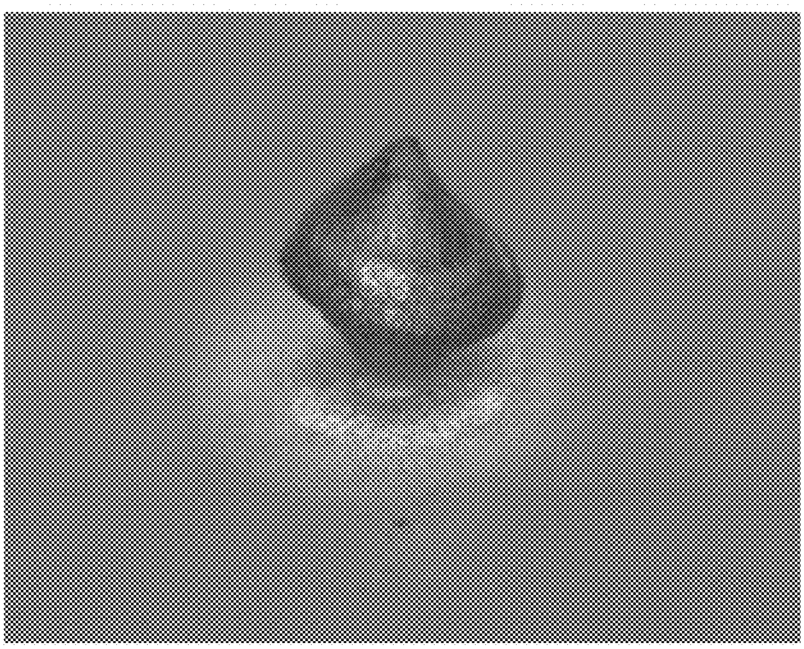

FIGS. 10A-10F are images of various 3D shapes printed using UV polymers and on-the-fly curing. FIG. 10A shows pillars (0.1 mm pitch, 0.25 mm tall). FIG. 10B shows a twisted sheet (0.5 mm width, 2 mm tall). FIG. 10C shows a box (1 mm length, 0.25 mm tall, 0.03 mm wall). FIG. 10D shows a hat (0.5 mm diameter, 0.5 mm tall). FIG. 10E shows a cone (0.5 mm diameter, 0.5 mm tall). FIG. 10F shows a bubble (0.5 mm diameter, 1 mm tall).

In embodiments of the present invention, UV illumination is being used to modify the properties of aerosol droplets as they are jetted onto a target surface. Specifically, the UV light is at least partially curing photopolymer droplets, and the resulting increased viscosity facilitates the formation of free standing structures. The UV light alternatively causes droplets of solvent-based nanoparticle dispersions to rapidly dry in-flight, likewise enabling 3D fabrication. This 3D fabrication can be performed using a wide variety of photopolymer, nanoparticle dispersion, and composite materials. The resulting 3D shapes can be free standing, without supports, and can attain arbitrary shapes by manipulating the print nozzle relative to the target substrate. The feature size is primarily determined by the jetting process, and can go down to 10 μm or even lower.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for fabricating a three-dimensional structure on a substrate, the method comprising:

surrounding aerosol droplets with a sheath gas;

propelling the aerosol droplets and the sheath gas from a deposition head toward the substrate;

partially curing or solidifying the aerosol droplets in flight by irradiating them with UV light;

fully curing or solidifying the aerosol droplets by irradiating them with UV light once they have been deposited as part of the three-dimensional structure; and fabricating a three-dimensional structure, a portion of which is vertically above empty space, without requiring a sacrificial support.

2. The method of claim 1 wherein the aerosol droplets comprise a UV photocurable polymer, and the fabricated three-dimensional structure comprises the UV cured photocurable polymer.

3. The method of claim 2 wherein the aerosol droplets comprise solid particles dispersed in the UV photocurable polymer, and the fabricated three-dimensional structure comprises the cured polymer comprising embedded solid particles.

4. The method of claim 3 wherein the solid particles comprise a ceramic, a metal, a fiber, or silicon.

5. The method of claim 1 wherein the aerosol droplets comprise metal nanoparticles, the method further comprising:

irradiating the aerosol droplets with the UV light;

heating the metal nanoparticles; and heating the aerosol droplets sufficiently to at least partially evaporate a solvent.

6. The method of claim 5 further comprising continuing to irradiate the metal nanoparticles after they have been deposited, thereby at least partially sintering the metal nanoparticles.

7. The method of claim 1 further comprising tilting or translating the deposition head with respect to the substrate.

8. The method of claim 1 comprising fabricating an overhanging structure without tilting the deposition head or the substrate.

9. The method of claim 1 wherein a standoff distance between the deposition head and the substrate is at least 1 mm.

10. The method of claim 9 wherein the standoff distance between the deposition head and the substrate is at least 2 mm.

11. The method of claim 1 comprising wherein partially curing or solidifying the aerosol droplets in flight increases a viscosity of the aerosol droplets.

12. The method of claim 1 comprising irradiating the aerosol droplets with UV light from more than one direction in flight.

13. The method of claim 1 comprising heating the aerosol droplets with UV light in flight and after the aerosol droplets have been deposited.

14. The method of claim 1 wherein the fabricated three-dimensional structure comprises an enclosed, hollow structure, an overhanging structure, or a mechanical scaffold.

* * * * *